US006580667B2

United States Patent
Taguchi

(12) United States Patent
(10) Patent No.: US 6,580,667 B2
(45) Date of Patent: Jun. 17, 2003

(54) MAGNETO-OPTICAL REPRODUCING HEAD HAVING A PLURAL TRANSFER FACING SURFACES AND INSULATION GAPS

(75) Inventor: Masakazu Taguchi, Kawasaki (JP)

(73) Assignee: Fujitsu Limited, Kawasaki (JP)

(*) Notice: Subject to any disclaimer, the term of this patent is extended or adjusted under 35 U.S.C. 154(b) by 0 days.

(21) Appl. No.: 09/873,623

(22) Filed: Jun. 4, 2001

(65) Prior Publication Data

US 2001/0046100 A1 Nov. 29, 2001

Related U.S. Application Data

(63) Continuation of application No. PCT/JP98/05548, filed on Dec. 7, 1998.

(51) Int. Cl.$^7$ .............................................. G11B 11/00
(52) U.S. Cl. ................... 369/13.32; 369/13.17
(58) Field of Search .......................... 369/13.12, 13.33, 369/13.17, 13.05, 13.02, 112.01, 112.05, 112.14, 112.13, 112.16, 112.18, 44.14; 360/114.01–114.09

(56) References Cited

U.S. PATENT DOCUMENTS

| | | | | |
|---|---|---|---|---|
| 4,633,450 A | * | 12/1986 | Gueugnon | 369/13 |
| 5,227,938 A | * | 7/1993 | Colineau et al. | 360/114 |
| 5,561,647 A | * | 10/1996 | Kayanuma | 369/48 |
| 5,920,538 A | * | 7/1999 | Il'Yashenko | 369/112 |
| 6,314,062 B1 | * | 11/2001 | Suzuki et al. | 369/13 |
| 6,320,841 B1 | * | 11/2001 | Watanabe et al. | 369/300 |
| 6,327,227 B1 | * | 12/2001 | Katayama | 369/13 |

FOREIGN PATENT DOCUMENTS

| | | |
|---|---|---|
| JP | 59-11557 | 1/1984 |
| JP | 59-94203 | 5/1984 |
| JP | 62-75955 | 4/1987 |
| JP | 4-502085 | 4/1992 |
| JP | 4-504922 | 8/1992 |

OTHER PUBLICATIONS

"Readout Characteristics of Magneto–Optic Readout Head;" Institute of Electronics, Information Communication Engineers; Shingaku–gihou MR87–1. 1998.

"Reproduction of Recorded signals on a Hard Disk with a Magneto–Optical Transer (MOT) Readout Head;" proceedings of the 21$^{st}$ Academic Conference on the Magnetics Society of Japan; 1997 5aF–11.

* cited by examiner

*Primary Examiner*—Tan Dinh
(74) *Attorney, Agent, or Firm*—Greer, Burns & Crain, Ltd.

(57) ABSTRACT

An information reproducing element formed by a plurality of transferring portions sandwiching magnetically insulatable regions is arranged so as to face an information recording medium. A plurality of record marks on the information recording medium are mutually insulatedly transferred onto the information reproducing element. A light beam is irradiated onto the information reproducing element. The record marks recorded by high density recording are then reproduced by magneto-optical reproduction or maximum-likelihood detection.

22 Claims, 23 Drawing Sheets

FIG. 5

| DIRECTION OF MAGNETIZATION | | | MAGNETIC Kerr EFFECT | t-2 | t | EXPECTATION VALUE |
|---|---|---|---|---|---|---|
| ➡ | ↔ | ➡ | 0 SAME DIRECTION | ↕ OR ⬇ | 0 | 0 | 0 |
| ⬅ | ↔ | ➡ | 0.1 DIFFERENT DIRECTION | ↕ OR ⬇ | 0 | 1 | 1 |
| ➡ | ↔ | ⬅ | 1.0 DIFFERENT DIRECTION | ↕ OR ⬆ | 1 | 0 | -1 |
| ⬅ | ↔ | ⬅ | 1 SAME DIRECTION | ⬆ OR ↕ | 1 | 1 | 0 |

MAGNETO-OPTICAL REPRODUCING HEAD HAVING A PLURAL TRANSFER FACING SURFACES AND INSULATION GAPS

This is a continuation of International Application No. PCT/JP98/05548 filed Dec. 7, 1998.

TECHNICAL FIELD

The present invention relates to an information reproducing element for transferring information magnetically or thermo-magnetically recorded on an information recording medium, and further to an information reproducing head comprising the information reproducing element, and an information reproducing apparatus and an information reproducing method for reproducing the information transferred onto the information reproducing element.

BACKGROUND ART

With a year-by-year increase in recording density of magnetic recording and thermo-magnetic recording, further enhancement of capacity of storage devices has been considered as a more important factor in order to process large data such as images and motion pictures. There are various methods for recording and reproducing information onto and from a recording medium using a magnetic film. For example, in case of a recording medium of magneto-optical disk, information is magnetically recorded, and then a light beam condensed to an extent near the diffraction limit is irradiated onto the medium thereby to detect a change in the magneto-optical effect caused in the magnetic film.

Such magneto-optical recording methods include an optical modulation recording method and a magnetic field modulation recording method. In the optical modulation recording method, first, a light beam is irradiated onto a magneto-optical disk so as to align the direction of magnetization of the magnetic film. Then, the irradiation of the light beam is modulated correspondingly to data to be recorded thereby to form record marks on the magnetic film. In reproduction, a light beam is irradiated thereby to read out a change in the magneto-optical effect in the reflected light. The plan view shape of the record mark formed by the optical modulation recording is a circle in case of pit position recording in which data "1" to be recorded corresponds to a record mark. In contrast, the shape is an ellipse in case of edge position recording in which data "1" to be recorded corresponds to an edge of a record mark.

In the magnetic field modulation recording method, with irradiating a light beam, a magnetic field applied is modulated correspondingly to data to be recorded thereby to form record marks on the magnetic film. In reproduction, a light beam is irradiated thereby to read out a change in the magneto-optical effect in the reflected light. The record mark formed by the magnetic field modulation recording is smaller than that by the optical modulation recording method, and the plan view thereof has an arrow feather shape.

Reduction in size of record marks formed on magneto-optical disks has caused a problem that a plurality of record marks exists within a beam spot during reproduction, whereby the reflected light suffers from interference, and whereby a sufficient reproduced signal is not obtained. MSR (magnetically induced super resolution) reproduction technology is a known technology for resolving the problem. In this technology, a predetermined region alone within a beam spot is made reproducible using the temperature distribution within the beam spot, whereby a reproduced signal is obtained with a high SN (signal to noise) ratio without influence of the waveform interference. However, even this MSR reproduction has a limit to high density reproduction.

Another known method for resolving the problem of degradation in SN ratio of the reproduced signal due to the occurrence of waveform interference within a beam spot is a PRML (partial-response maximum-likelihood) method. This method is a signal processing method, for equalizing a signal to a known waveform interference type, and then, maximum likelihood detection is carried out. That is, a reproduced signal is obtained from the reflected light suffering from the waveform interference caused by a plurality of record marks. Then, a sample value is detected from the reproduced signal at each channel clock. Finally, the most probable data is reproduced from both the expectation value of the waveform interference and a series of the sample values. This process permits the reproduction of accurate data even from a reproduced signal with a low SN ratio.

However, the waveform interference in a magneto-optical disk is similar to a waveform interference type PR (1, 1) having many low-frequency signal components. In case that record marks formed by high density recording are reproduced by the PRML method, the expectation value in the maximum likelihood detection increases thereby to degrade the amplitude margin, whereby the influence of noise in the low frequency band increases thereby to prevent accurate reproduction. As such, even this PRML method has a limit to high density reproduction.

Further, in case that the PRML method is applied to the MSR reproduction, the signal band is shifted into a higher frequency band by the super resolution effect thereby to permit a higher density reproduction. However, there has been a problem that the substrate causes noise in the low frequency band thereby to prevent the realization of the effect of PRML method.

Meanwhile, a method is known in which a magnetic film having a large magneto-optical effect is used thereby to obtain a large reproduced signal, whereby record marks formed by high density recording are reproduced. For example, in case that information is magnetically recorded onto a magnetic disk, a recording/reproducing magnetic head using small magnetic poles can perform high density recording. However, in reproduction using such a magnetic head, merely a small electromotive force is induced because of the small size of the magnetic poles, thereby causing the problem of degradation in quality of the obtained reproduced signal. In order to resolve the problem, the magnetic flux of the magnetic disk having undergone high density recording is transferred onto a magnetic film having a large magneto-optical effect, and then a laser light is irradiated onto the magnetic film thereby to reproduce a signal from the transferred magnetic flux by using the magneto-optical effect. This approach generates a high quality reproduced signal.

Such a reproducing method is reported in: "Readout Characteristics of a magneto-optic Readout head" in Shingaku-gihou MR87-1, the Institute of Electronics, Information and Communication Engineers; and "Reproduction of recorded signals on a hard disk with a magneto-optical transfer (MOT) readout head" in Proceedings of the 21st Academic Conference of the Magnetics Society of Japan (1997) 5aF-11. However, in a magnetic head used in such a reproducing method, the amplitude of a reproduced signal notably decreases in case of a recording wavelength of 2 $\mu$m or below, thereby causing a problem that the high-density recorded information can not be reproduced.

The principal object of the present invention is to provide an information reproducing element which comprises a plurality of transfer portions separated from each other by magnetically insulating regions and is capable of reproducibly transferring information high-density recorded on an information recording medium. A further object of the present invention is to provide an information reproducing head comprising the information reproducing element, and an information reproducing apparatus and an information reproducing method for reproducing the information on the information recording medium by maximum likelihood detection by using the information reproducing head.

DISCLOSURE OF THE INVENTION

An information reproducing element of the present invention which is arranged so as to face an information recording film on which a plurality of record marks are formed in parallel and is for transferring the magnetic flux of the information recording film to be reproduced, comprises a plurality of transferring portions having magnetically insulating regions intervening therebetween in the direction in which the record marks are aligned in parallel.

In the above-mentioned configuration, in another information reproducing element of the present invention, the direction in which the record marks are aligned in parallel is the length direction and/or the width direction of the tracks on the information recording film.

In the above-mentioned configuration, another information reproducing element of the present invention further comprises a transfer reproducing film onto which the transferred magnetic flux is to be reproduced, on the side opposite to the side of the transferring portions facing the information recording film.

In the information reproducing element of the present invention, a plurality of transferring portions are provided with magnetically insulating regions intervening therebetween, a plurality of small record marks are transferred without interfering with each other. Accordingly, record marks which are high-density recorded can be transferred reproducibly. In case that the Faraday effect is used, a reproduced signal is obtained from the light transmitted through the information reproducing element, whereas in case that the Kerr effect is used, a reproduced signal is obtained from the light reflected in the transfer reproducing film onto which the magnetic flux is transferred via the transferring portion. Further, the plurality of transferring portions can simultaneously transfer record marks within the same track, or alternatively, over separate tracks. Furthermore, the plurality of transferring portions can simultaneously transfer a matrix of record marks spreading both within a track and over separate tracks.

In the above-mentioned configuration, another information reproducing element of the present invention further comprises a transfer layering portion in which the transferring portions and the insulating regions are alternatingly layered in the direction in which the record marks are aligned in parallel and which is arranged so as to face one or a plurality of the record marks.

In the information reproducing element of the present invention, when transmitted light is transmitted through the transfer layering portion, the polarization plane is rotated by the transferred magnetic flux. At that time, the transmitted light is transmitted through the transferring portion having the plurality of layers stacked with intervening insulating regions. Accordingly, the magneto-optical effect is amplified thereby to improve SN ratio.

In an information reproducing element which is arranged so as to face an information recording film on which a plurality of record marks are formed in parallel and is for transferring the magnetic flux of the information recording film to be reproduced, comprises: two transferring portions which have a magnetically insulating region intervening therebetween in the direction in which the record marks are aligned in parallel and are arranged on the surface facing the information recording film; and a transfer reproducing surface onto which a light beam for reproducing from the transferred magnetic flux and which is arranged on the other surface; wherein both the dimension of the surface of the transferring portion facing the information recording film and the dimension of the insulating region are generally the same as the reference clock length for record reproduction.

In the information reproducing element of the present invention, the magnetic flux of the information recording film is transferred via the transferring portions, and then a reproduced signal is obtained from the reflected light of the light beam irradiated onto the transfer reproducing surface.

An information reproducing head of the present invention comprises: the information reproducing element having the above-mentioned configuration; and a slider onto which the information reproducing element is attached and which is arranged so as to face an information recording medium having the information recording film.

In the information reproducing head of the present invention, a slider is provided and arranged on an information recording medium so as to float or slide, and an information reproducing element is mounted on the slider, whereby record marks of the information recording medium are transferred.

An information reproducing apparatus of the present invention comprises: a photoelectric converting unit for receiving emitted light from the information reproducing element and detecting a reproduced signal; a sample value detecting unit for obtaining a sample value of waveform interference from the detected reproduced signal; and a maximum-likelihood detecting unit for performing maximum-likelihood detection depending on the waveform interference type of the information reproducing element by using the sample value obtained by the sample value detecting unit.

An information reproducing method of the present invention comprises the steps of irradiating a light beam onto the information reproducing element arranged so as to face an information recording film and detecting a reproduced signal by the magneto-optical effect; obtaining a sample value of waveform interference from the reproduced signal; and reproducing the information by maximum-likelihood detection depending on the waveform interference type of the information reproducing element by using the obtained sample value.

In the information reproducing apparatus and the information reproducing method of the present invention, an existing waveform interference type is generated by a plurality of transferred record marks, and maximum-likelihood detection is applied on the detected reproduced signal, whereby high precision reproduction is achieved even for a reproduced signal having a low SN ratio.

BRIEF DESCRIPTION OF THE DRAWINGS

FIG. 5 is a diagram showing the relation between the direction of magnetization and the expectation value reproduced by using a transferring body of Embodiment 1.

BEST MODE FOR CARRYING OUT THE INVENTION

The present invention is described below in detail with reference to the drawings illustrating the embodiments.

Embodiment 1

Figure 1:
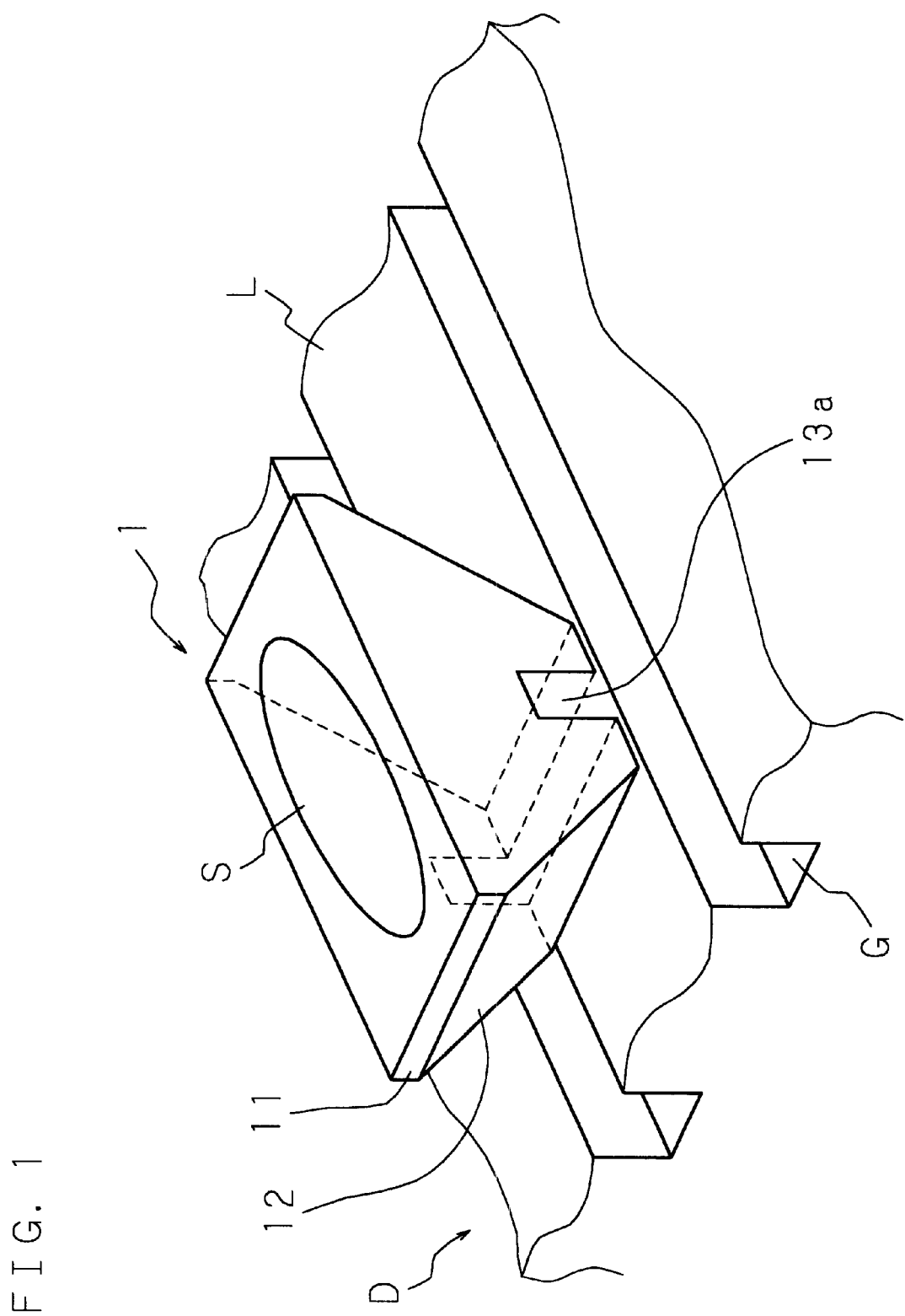
FIG. 1 is a perspective view showing the structure of an information reproducing element of Embodiment 1 of the present invention.
Figure 2:
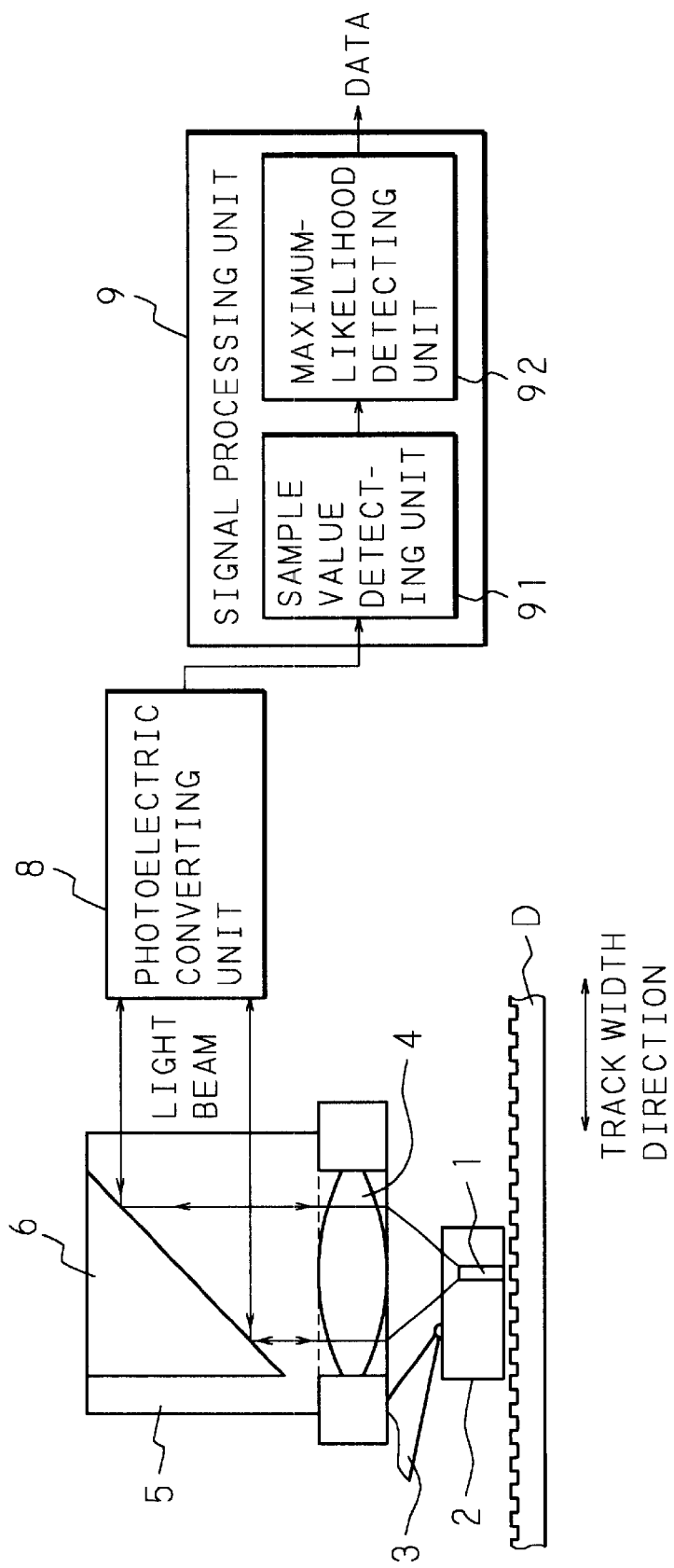
FIG. 2 is a configuration diagram showing the structure of a reproducing head of the present invention comprising the information reproducing element of FIG. 1.

FIG. 1 is a perspective view showing the structure of a transferring body of Embodiment 1 of the present invention. FIG. 2 is a configuration diagram showing the structure of a reproducing head of the present invention comprising the transferring body of FIG. 1. As shown in FIG. 2, a reproducing head in which a transferring body 1 is attached to a slider 2 is supported by a suspension 3 and arranged above a magneto-optical disk D. An information reproducing apparatus comprises: a reproducing head; an optical system including a laser light source (not shown) for emitting a light beam; an actuator fixing unit 5 for mounting and moving the optical system; a photoelectric converting unit 8 for receiving reflected light; and a signal processing unit 9 for reproducing data by using the reproduced signal obtained by the photoelectric converting unit 8. The optical system comprises: a laser light source; a stand-up mirror 6; and an object lens 4 supported by an actuator comprising an electromagnetic driving mechanism capable of driving in the focus direction and the tracking direction. The signal processing unit 9 comprises: a sample value detecting unit 91 for obtaining a sample value from a reproduced signal being inputted; and a maximum-likelihood detecting unit 92 for performing maximum-likelihood detection of data from a series of obtained sample values depending on a waveform interference type to be described later.

The reproducing head is arranged such that the transferring body 1 faces the magneto-optical disk D. Transparent lubricant film is applied onto both the surface facing the magneto-optical disk D and the surface to which the light beam is irradiated, thereby forming protective layers (not shown). The magneto-optical disk D comprises: a magneto-optically recordable recording film on a land substrate having tracks L of a width of about 0.8 μm; and grooves G for tracking. On the magneto-optical disk D, data is recorded by record marks having a minimum mark length of 0.1 μm.

Figure 3:
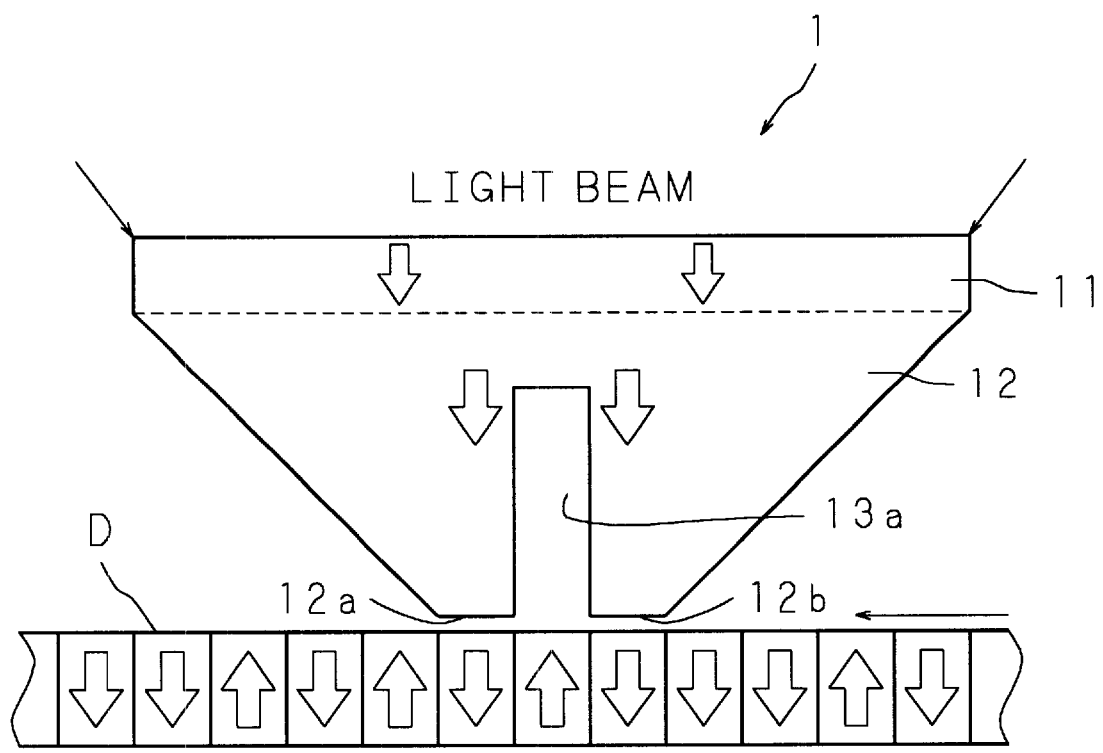
FIG. 3 is an illustrative diagram showing the state of magnetization of a transferring body of an information reproducing apparatus of the present invention during reproduction.

The transferring body 1 is formed by a magnetic oxide such as $TbBi_2Fe_4GaO_{12}$, and has a width generally equal to the width of a track of the magneto-optical disk D as shown in FIG. 1. As shown in FIG. 3, a transfer reproducing film 11 having a shape of rectangular plate is formed on the light beam irradiation surface side of the transferring body 1. Two transfer paths (transferring portions) 12 are formed on the side facing the magneto-optical disk D, so as to be separated by an insulating gap 13a in the track length direction. By virtue of this, the transfer facing surfaces 12a, 12b which are tip surfaces of the transferring paths 12 are magnetically insulated with each other. The transferring paths 12 have a shape in which both outer side faces are oblique such that the cross section decreases in the direction from the transfer reproducing film 11 side to the transfer facing surfaces 12a, 12b, and in which the tip is bifurcated by the central insulating gap 13a. The irradiation surface of the transfer reproducing film 11 and the transfer facing surfaces 12a, 12b are formed in predetermined dimensions in the track length direction.

In the fabrication of the transferring body 1 having such a shape, for example, a magnetic garnet film such as $TbBi_2Fe_4GaO_{12}$ is grown on a GGG (gadolinium-gallium-garnet) substrate by LPE (liquid-phase epitaxy) method. The magnetic garnet film is then covered with resist. After the exposure, development, and etching processes, the above-mentioned shape is obtained. The GGG substrate may be removed or alternatively may be remained after the formation process. The method of fabrication of the transferring body 1 is not restricted to this.

FIG. 3 is an illustrative diagram showing the state of magnetization of the transferring body during the reproduction of the magneto-optical disk D by the information reproducing apparatus. The transferring body 1 moves relatively to and in the length direction of tracks. With regard to the dimensions of the transferring body 1 in the track length direction, as shown in FIG. 3, the transfer facing surfaces 12a, 12b are formed in a dimension generally equal to one channel clock length (reference clock length), while the surface (transfer reproducing surface) of the transfer reproducing film 11 is formed in a dimension much larger than the diameter of the irradiated light beam spot. The interval of the insulating gap 13a in the track length direction is generally equal to one channel clock length.

Figure 4A:
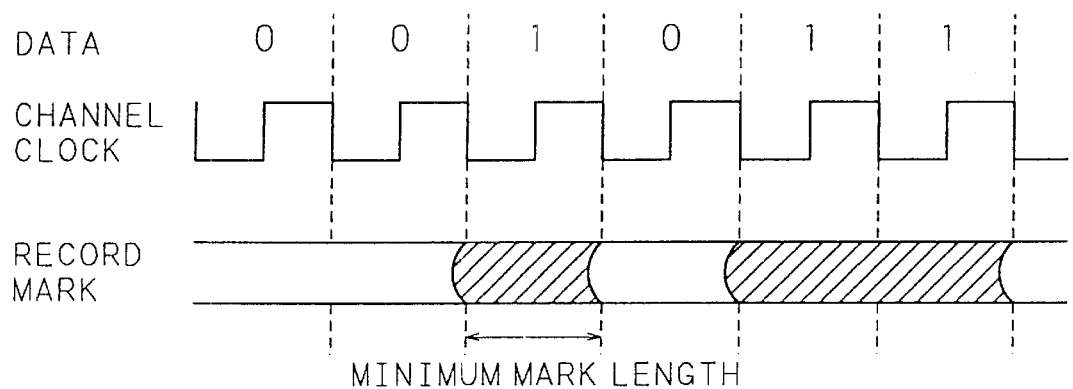
FIGS. 4A–4B are illustrative diagrams showing the relation between the minimum mark length and the channel clock depending on the type of record encoding.
Figure 4B:
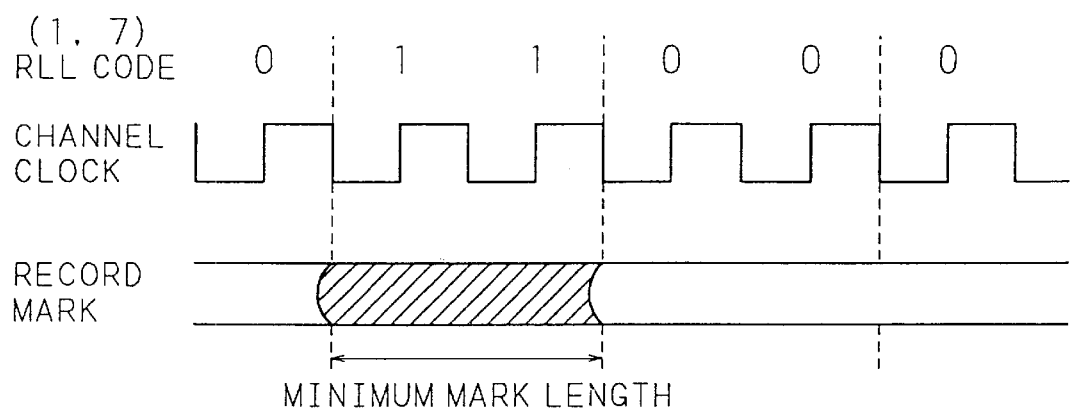

Here, the channel clock length is a length determined both by the relative velocity between the transferring body 1 and the magneto-optical disk D and by the channel clock frequency. The relation between the channel clock length and the minimum mark length of the record marks is described below. FIGS. 4A–4C are illustrative diagrams showing the relation between the minimum mark length and the channel clock depending on the type of recording encoding. FIG. 4A shows the case of NRZI recording, while FIG. 4B shows the case of (1, 7) RLL encoding.

One channel clock length corresponds to one period of channel clock signal. In case that data is recorded by magnetic field modulation recording by the NRZI recording, the minimum duration of magnetic field inversion during the recording is one channel clock length. Accordingly, as show in FIG. 4A, one channel clock length is the same as the minimum mark length of the record marks. In contrast, in case that the data to be recorded is modulated by the (1, 7) RLL encoding and then recorded by magnetic field modulation recording in edge position recording method, the minimum duration of magnetic field inversion is two channel clock lengths. Accordingly, as shown in FIG. 4B, one channel clock length is half the minimum mark length of the record marks. As such, the channel clock length and the minimum mark length can be different from each other depending on the type of recording encoding.

As shown in FIG. 3, each transfer facing surface 12a, 12b faces each of two record marks separated by one channel clock length in the track length direction, thereby transferring the magnetic flux of the record mark via the transfer path 12 onto the transfer reproducing film 11. Since the transfer facing surfaces 12a, 12b are magnetically insulated with each other in the track length direction as described above, the magnetic flux of the record marks can be transferred onto the transfer reproducing film 11 without affecting with each other even in case of a small record mark length.

In reproduction, a light beam is irradiated to the transferring body 1. Since the magnetization of two record marks is transferred onto the transfer reproducing film 11, the beam spot S contains two record marks. This causes waveform interference. The reflected light suffering from the waveform interference is received by the photoelectric converting unit 8, where a reproduced signal is detected using the Kerr effect (see FIG. 2). Since the magnetic garnet film constituting the transfer reproducing film 11 has a large magneto-optical effect, the reproduced signal from the transferred record mark has a high SN ratio. Further, since the magnetic flux of the record mark is transferred from the transfer facing surfaces 12a, 12b having one channel clock length onto the transfer reproducing film 11 having a larger area, the number of record marks within the beam spot S is reduced, thereby permitting a higher precision in the reproduced signal.

Described below is a method of signal processing for performing maximum-likelihood detection of data from the reproduced signal suffering from the waveform interference.

The sample value detecting unit 91 obtains a sample value from the obtained reproduced signal. The sample value is obtained on the basis of the waveform interference type depending on the shape of the transferring body 1. Since the transferring body 1 has the insulating gap 13a of one channel clock length as shown in FIG. 3, waveform interference in the magnetic flux occurs between the two outer record marks among three record marks within three channel clock lengths. FIG. 5 is a diagram showing the relation between the direction of magnetization and the expectation value reproduced by using the transferring body of Embodiment 1. There are the following four cases in the direction of magnetization in the three record marks within three channel clock lengths.

In a first case, the direction of magnetization is down for both the first and the third channel clocks, that is, the data is "0" both at t-2 and at t. This state is referred to as $S_0$, and the expectation value in the state is 0. The direction of the second channel clock does not matter. In a second case, the direction of magnetization is down for the first channel clock, and up for the third channel clock, that is, the data is "0" at t-2, and "1" at t. This state is referred to as $S_1$, and the expectation value in the state is 1. In a third case, the data is "1" at t-2, and "0" at t. The expectation value in the state is –1. In a fourth case, the data is "1" both at t-2 and at t. The expectation value in the state is 0.

Figure 6:
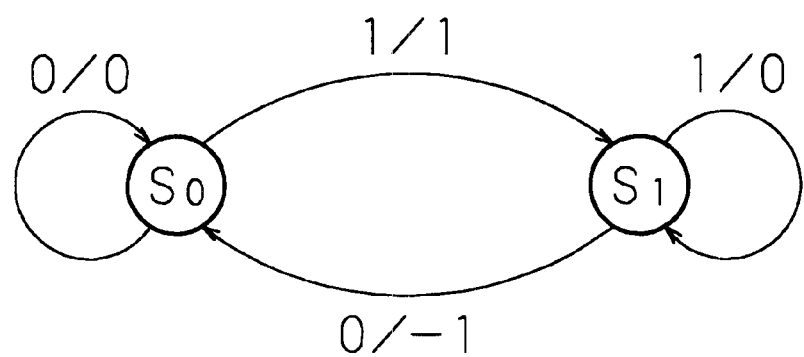
FIG. 6 is a diagram of the state transition of waveform interference type PR (1, 0, −1).

From FIG. 5, there are three types of 1, 0, and –1 in the expectation value. Accordingly, it is known in advance that the waveform interference type is PR(1, 0, –1). Thus, the detected level of a reproduced signal can be represented by a sample value obtained in three-value sampling at each channel clock. The sample value obtained as such undergoes maximum-likelihood detection by the maximum-likelihood detecting unit 92, whereby the data is reproduced. FIG. 6 is a diagram of the state transition for PR (1, 0, –1). In the FIG., "0"/–1 indicates that the data is "0" and the sample value is "–1" in the transition from a state $S_1$ to a state $S_0$. The method of detecting data from the waveform interference type and a series of sample values is known to the public, and applicable to the case of PR (1, 0, –1). Thus, description is omitted herein.

As described above, the transferring body 1 of the present Embodiment 1 is composed of a magnetic garnet film having a large magneto-optical effect, and further two transfer paths are provided on the both sides of the insulating gap 13a of one channel clock length. Since two record marks separated from each other by one channel clock length in the track length direction are transferred through the independent transfer paths 12 magnetically insulated with each other, the record marks recorded by high density recording can be reproducibly transferred onto the transferring body 1. Further, since the number of record marks within the beam spot S irradiated onto the transfer reproducing film 11 is reduced, the record marks recorded by high density recording can be reproduced by super resolution reproduction. Furthermore, since waveform interference occurs in the record marks transferred onto the transfer reproducing film 11, the maximum-likelihood detection permits a high precision reproduction.

Further, in the waveform interference type PR (1, 0, –1), a differential element is included in the frequency band of the reproduced signal thereby to eliminate low frequency noise, thereby permitting maximum-likelihood detection with a long constraint length. This improves the detection performance. In the maximum-likelihood detection of the waveform interference type PR (1, 0, –1), a maximum-likelihood detector presently used in the reproduction of magnetic disks is usable.

The description has been made for the case that the insulating region provided in the transferring body 1 is a vacant space of the insulating gap 13a. However, this is not restrictive, and a similar effect is obtained also in the case that the transfer paths 12 are separated by an insulating material such as glass and polycarbonate.

Embodiment 2

Figure 7:
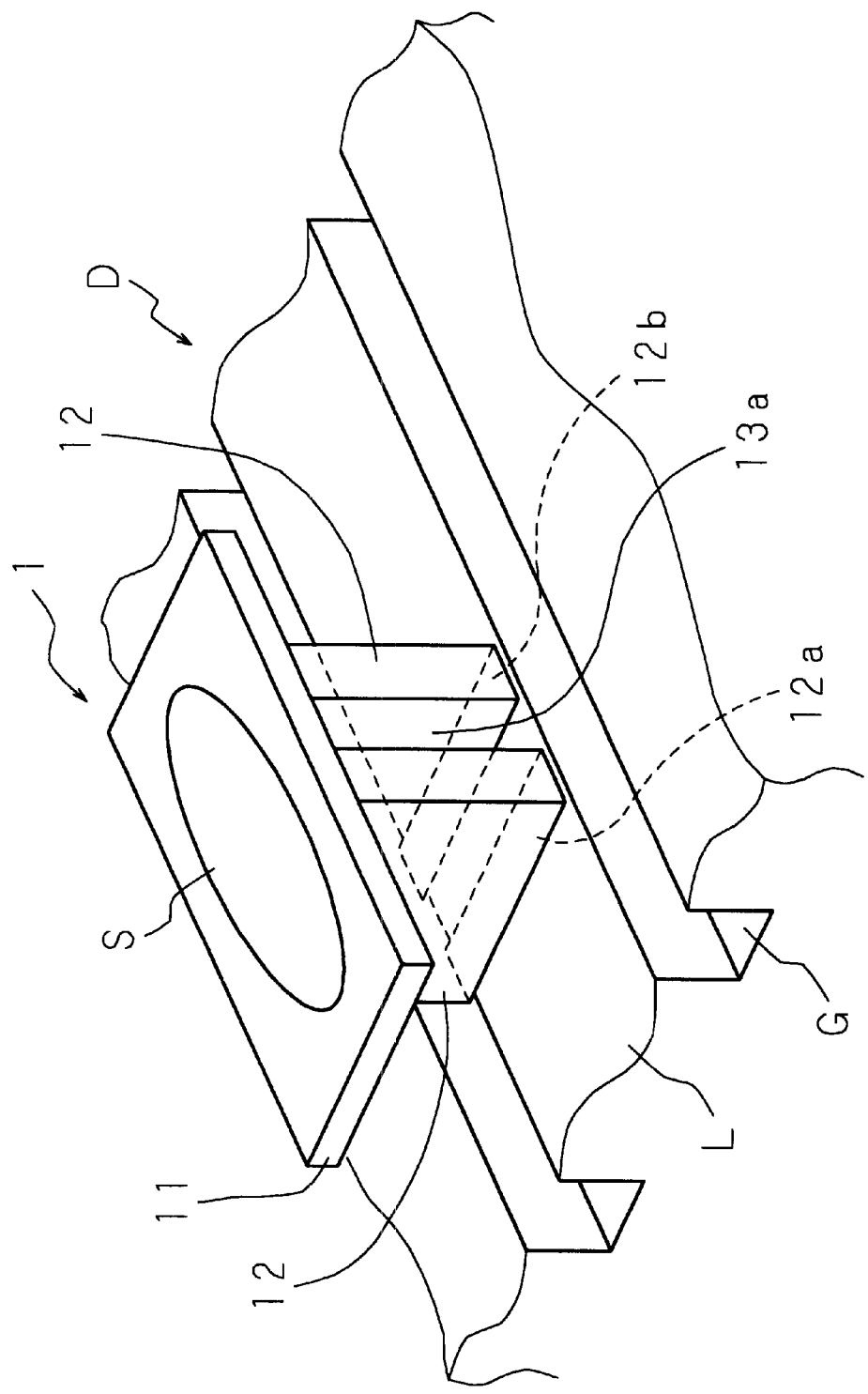
FIG. 7 is a perspective view showing the structure of a transferring body of Embodiment 2.

FIG. 7 is a perspective view showing the structure of a transferring body 1 of Embodiment 2. Transfer paths 12 have the shape of rectangular plates, and are formed on the lower surface of a transfer reproducing film 11 so as to be separated from each other by an insulating gap 13a having a predetermined dimension in the track length direction. The other configuration is similar to that in Embodiment 1. In Embodiment 1, description has been made for a case that the transfer reproducing film 11 and the transfer paths 12 are formed in one piece using a common magnetic material. However, in Embodiment 2, they may be composed of different magnetic materials. For example, the transfer paths 12 may be composed of NiFe, while the transfer reproducing film 11 may be composed of $TbBi_2Fe_4GaO_{12}$. Even in such a case, a similar effect is obtained in the above-mentioned method of reproduction. Further, since the transfer paths 12 have the shape of rectangular plates, it is easy to set both the dimension of the insulating gap 13a and the dimension of the transfer paths 12. The waveform interference type is determined by both the dimension of the insulating gap 13a and the dimension of the transfer paths 12. For example, in case that the diameter of the beam spot S is substantially different from the dimension of the transfer paths 12, high precision transfer is achieved by setting a wider gap of the insulating region, and the maximum-likelihood detection of the waveform interference type can be carried out depending on the transfer paths of the transferring body.

Embodiment 3

Figure 8:
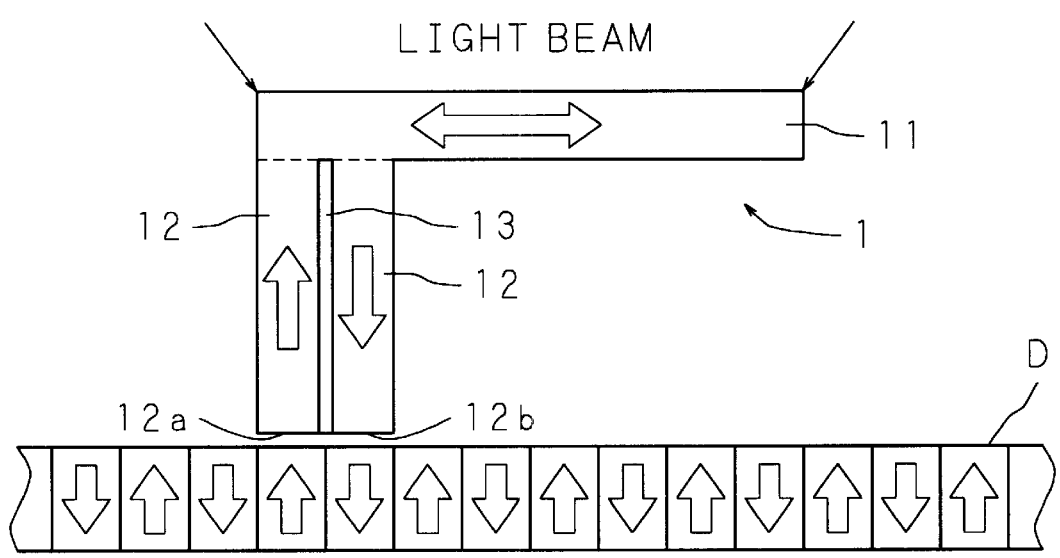
FIG. 8 is an illustrative diagram showing the structure and the state of magnetization of a transferring body of Embodiment 3 during reproduction.

FIG. 8 is an illustrative diagram showing the structure and the state of magnetization of a transferring body of Embodiment 3 during reproduction. A transferring body 1 has transfer paths 12 which are formed on the lower surface of a transfer reproducing film 11 and have the shape of rectangular plates having an insulating material 13, such as glass and polycarbonate, intervening therebetween. The transfer reproducing film 11 and the transfer paths 12 are composed of magnetic garnet films such as $TbBi_2Fe_4GaO_{12}$. The two transfer paths 12 are arranged so as to sandwich the insulating material 13 in the track length direction. The dimension of the transfer facing surfaces 12a, 12b in the track length direction is shorter than one channel clock length, while the overall dimension of the transfer paths 12 having the insulating material 13 intervening therebetween in the track length direction is generally equal to two channel clock lengths.

In case that the reproduction of a magneto-optical disk D is carried out similarly to Embodiment 1 by using the transferring body 1 having such a structure, the magnetic flux of record marks which correspond to the transfer facing surfaces 12a, 12b and are adjacent to each other in the track length direction is transferred via the transfer paths 12 onto the transfer reproducing film 11. At that time, since the transfer facing surfaces 12a, 12b are magnetically insulated with each other by the insulating material 13, the transfer is carried out without being affected by the magnetization with each other. It is known in advance that the waveform interference of waveform interference type PR(1, 1) occurs in this transferring body 1. Thus, a reproduced signal is obtained from the reflected light suffering from the waveform interference. A sample value is obtained from the reproduced signal, and the data is then reproduced by the maximum-likelihood detection of waveform interference type PR(1, 1).

As such, an effect similar to that of Embodiment 1 is obtained using the transferring body 1 of Embodiment 3. That is, by providing the insulating material 13 intervening between the transfer paths 12, the record marks recorded by high density recording can be reproducibly transferred onto the transferring body 1. Further, the number of record marks within the beam spot S irradiated onto the transfer reproducing film is reduced, and further the record marks transferred onto the transfer reproducing film 11 is reproduced by the maximum-likelihood detection in a high precision. Using this transferring body 1, SN ratio has been improved by about 2 dB in comparison with the ordinary reproduction of a magneto-optical disk D by ordinary magneto-optical reproduction.

Embodiment 4

Figure 9:
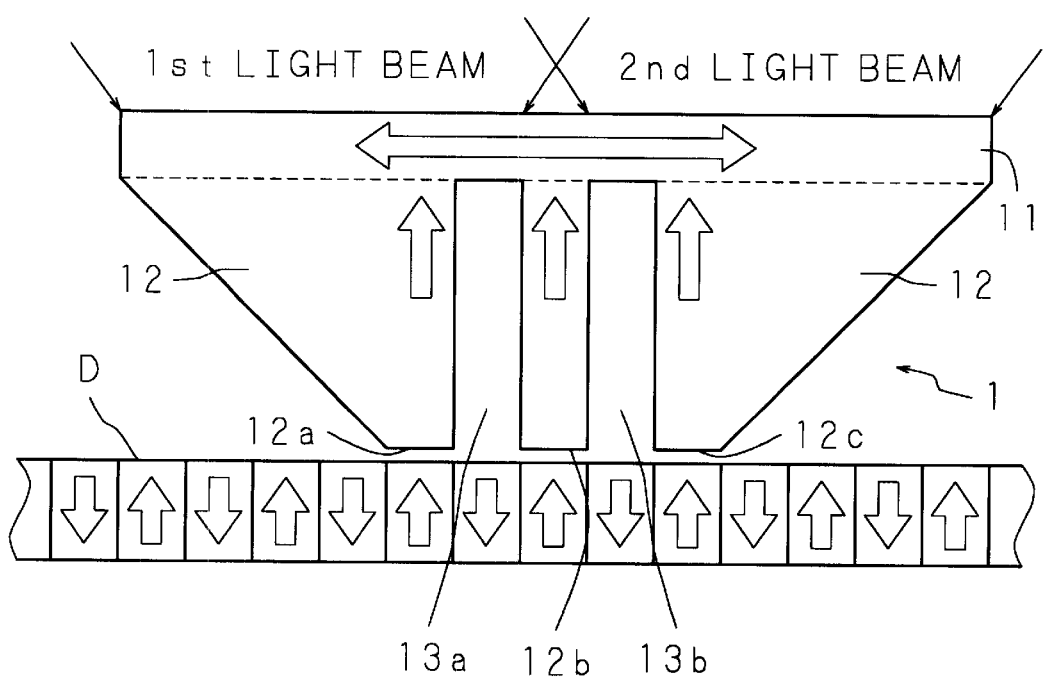
FIG. 9 is an illustrative diagram showing the structure and the state of magnetization of a transferring body of Embodiment 4 during reproduction.

FIG. 9 is an illustrative diagram showing the structure and the state of magnetization of a transferring body of Embodiment 4 during reproduction. A transferring body 1 has transfer paths 12 which are formed on the lower surface of a transfer reproducing film 11 and have a shape in which the cross section decreases gradually. The transfer reproducing film 11 and the transfer paths 12 are composed of magnetic garnet films such as $TbBi_2Fe_4GaO_{12}$. Two insulating gaps 13a, 13b are formed on the side of the transferring body 1 facing a magneto-optical disk D, whereby three transfer paths 12 are formed so as to be separated by the insulating gaps 13a, 13b in the track length direction. The dimension of the transfer facing surfaces 12a, 12b, 12c of the transfer paths 12 in the track length direction is generally equal to one channel clock length, while the dimension of the insulating gaps 13a, 13b in the track length direction is generally equal to one channel clock length.

In case that the reproduction of the magneto-optical disk D is carried out similarly to Embodiment 1 by using the transferring body 1 having such a structure, the record marks which correspond to the transfer facing surfaces 12a, 12b, 12c and are separated by one channel clock length in the track length direction is transferred via the transfer paths 12 onto the transfer reproducing film 11. At that time, since the transfer facing surfaces 12a, 12b, 12c are magnetically insulated with each other by the insulating gaps 13a, 13b, the transfer is carried out without being affected by the magnetization with each other. When first and second light beams are irradiated onto the respective half regions of the transfer reproducing film 11, waveform interference of waveform interference types PR(1, 0, −1) and PR(−1, 0, 1) occurs in the respective half regions of the transfer reproducing film 11. It is known in advance that the subtraction of these reflected light beams with each other results in the waveform interference of waveform interference type PR(1, 0, 0, 0, −1). Thus, a reproduced signal is obtained from the subtraction of the reflected light beams. A sample value is obtained from the reproduced signal, and the data is then reproduced by the maximum-likelihood detection of waveform interference type PR(1, 0, 0, 0, −1).

As such, an effect similar to that of Embodiment 1 is obtained using the transferring body 1 of Embodiment 4. That is, the record marks recorded by high density recording can be reproducibly transferred onto the transferring body 1. Further, the number of record marks within the beam spot S irradiated onto the transfer reproducing film is reduced, and further the record marks transferred onto the transfer reproducing film 11 is reproduced by the maximum-likelihood detection in a high precision. Further, in Embodiment 4, record marks of five channel clock lengths can be reproduced by using the relatively simple waveform interference type which contains a differential shape and has a long constraint length and three-valued expectation values consisting of 1, 0, and −1.

Embodiment 5

Figure 10:
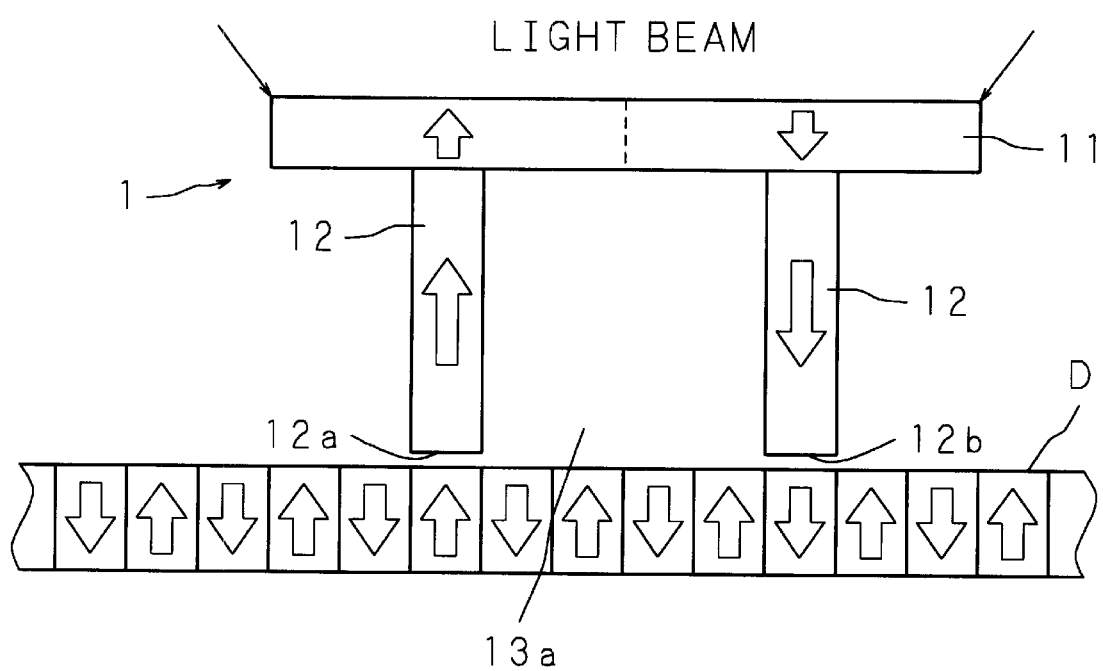
FIG. 10 is an illustrative diagram showing the structure and the state of magnetization of a transferring body of Embodiment 5 during reproduction.

FIG. 10 is an illustrative diagram showing the structure and the state of magnetization of a transferring body of Embodiment 5 during reproduction. A transferring body 1 is formed by two transfer paths 12 which are formed on the lower surface of a transfer reproducing film 11 and have the shape of rectangular plates having an insulating gap 13a intervening therebetween. The transfer reproducing film 11 and the transfer paths 12 are composed of magnetic garnet films such as $TbBi_2Fe_4GaO_{12}$. The dimension of the transfer facing surfaces 12a, 12b in the track length direction is generally equal to one channel clock length, while the dimension of the insulating gap 13a in the track length direction is generally equal to four channel clock lengths.

In case that the reproduction of a magneto-optical disk D is carried out similarly to Embodiment 1 by using the transferring body 1 having such a structure, the magnetic flux of record marks which correspond to the transfer facing surfaces 12a, 12b and are separated by four channel clock lengths in the track length direction is transferred via the transfer paths 12 onto the transfer reproducing film 11. At that time, since the transfer facing surfaces 12a, 12b are magnetically insulated with each other by the insulating gap 13a, the transfer is carried out without being affected by the magnetization with each other. Waveform interference of waveform interference type PR(1, 0, 0, 0, 0, −1) occurs in the transfer reproducing film 11. A reproduced signal is obtained from the reflected light. A sample value is obtained from the reproduced signal, and the data is then reproduced by the maximum-likelihood detection of waveform interference type PR(1, 0, 0, 0, 0, −1).

As such, an effect similar to that of Embodiment 1 is obtained using the transferring body 1 of Embodiment 5. That is, the record marks recorded by high density recording can be reproducibly transferred onto the transferring body 1. Further, the number of record marks within the beam spot S irradiated onto the transfer reproducing film is reduced, and further the record marks transferred onto the transfer reproducing film 11 is reproduced by the maximum-likelihood detection in a high precision.

Embodiment 6

Figure 11:
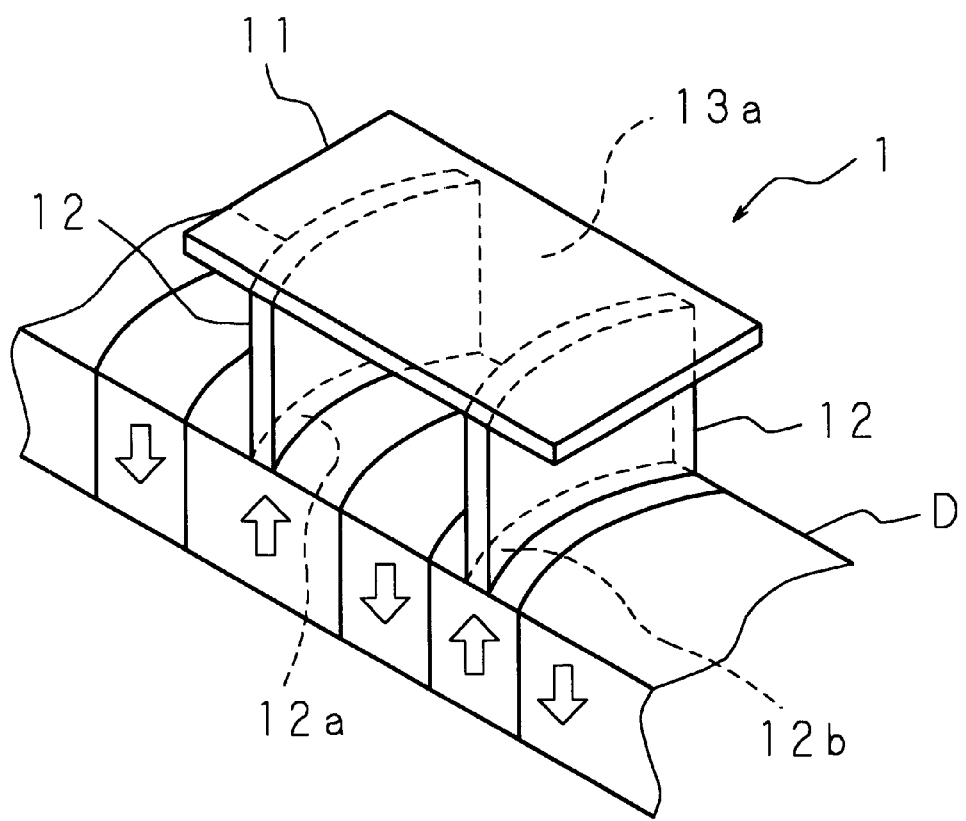
FIG. 11 is a perspective view showing the structure of a transferring body of the present invention having transfer surfaces of an arrow feather shape.

The description of the Embodiments 1 through 5 has been made for the cases that the shape of the transfer facing surface of the transfer paths 12 is rectangular. However, the shape of record marks can be different depending on the recording method. FIG. 11 is a perspective view showing the structure of a transferring body having transfer surfaces of an arrow feather shape. As shown in the FIG., a transferring body 1 has two transfer paths 12 separated by an insulating gap 13a having a predetermined length in the track length direction. Each transfer path 12 is formed in the shape of a plate curved to one side. The transfer facing surfaces 12a, 12b have an arrow feather shape. Information is recorded onto a magneto-optical disk D by magnetic field modulation recording method. The shape of record marks is an arrow feather shape in plan view. The other configuration is similar to that in Embodiment 2, and hence the description is omitted. As such, causing the transfer facing surfaces 12a, 12b to have approximately the same shape as that of the record marks improves the transfer precision.

Figure 12:
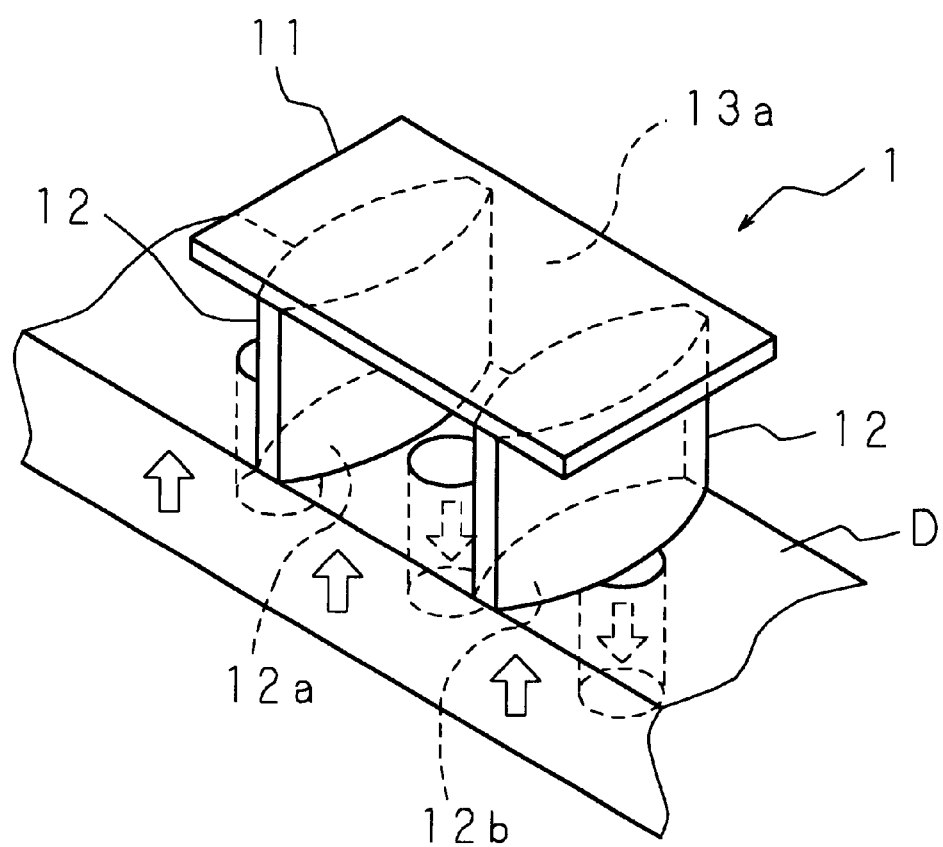
FIG. 12 is a perspective view showing the structure of a transferring body of the present invention having transfer surfaces of an ellipse shape.

FIG. 12 is a perspective view showing the structure of a transferring body having transfer surfaces of an ellipse shape. As shown in the FIG., a transferring body 1 has two transfer paths 12 arranged so as to be separated by an insulating gap 13a having a predetermined length in the track length direction. Transfer paths 12 are formed in a columnar shape in which the transfer facing surfaces 12a, 12b have an ellipse shape. Information is recorded onto a magneto-optical disk D by magnetic field modulation recording method. The shape of record marks is an ellipse in plan view. The other configuration is similar to that in Embodiment 2, and hence the description is omitted. As such, causing the transfer facing surfaces 12a, 12b to have approximately the same shape as that of the record marks improves the transfer precision.

In the above-mentioned Embodiments 1 through 5, the transfer facing surfaces of the transfer paths 12 have a rectangular shape. Since the marks formed onto magnetic disks have generally a rectangular shape, the transfer precision is much improved in the reproduction of data recorded on magnetic disks.

Embodiment 7

Figure 13A:
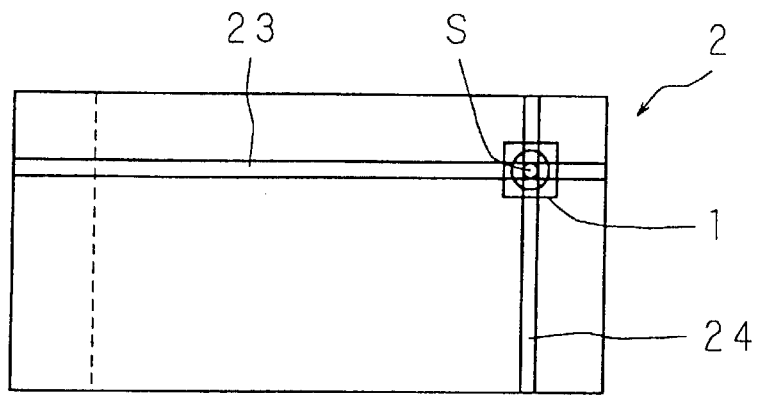
FIGS. 13A–13C are diagrams of the structure of a slider of the present invention.
Figure 13B:
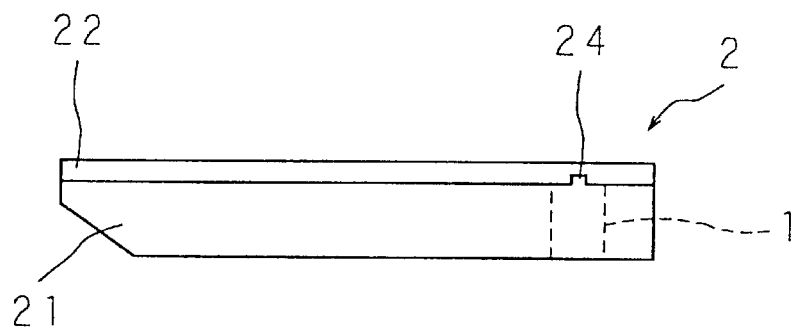
Figure 13C:
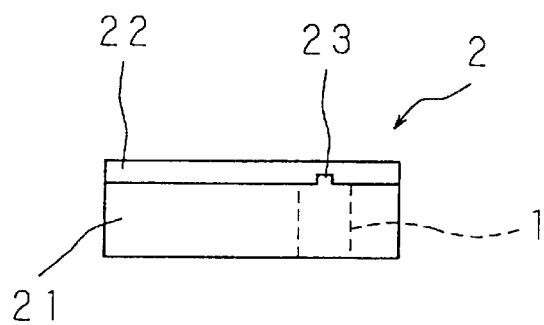

Described below is the structure of a slider constituting an information reproducing head of the present invention. A slider on which a transferring body 1 is mounted floats or slides by air flow between a recording medium and the slider. The slider slightly deviates in the track width direction during reproduction. In order for a light beam to follow the deviation during the irradiation onto the transferring body, a guiding portion such as ridges or grooves is formed in the slider. FIGS. 13A–13C are diagrams of the structure of a slider in which ridges are formed as the guiding portion. FIG. 13A is a plan view, while FIGS. 13B and 13C are side views. The slider 2 has the shape of a plate in which the medium-facing surface is cut obliquely in the rear portion relative to the movement direction. For example, the main body 21 thereof is formed with synthetic resin and coated with a transparent protective film 22 thereon. The transparent protective film 22 may be any material capable of transmitting a light beam and of protecting a transfer reproducing film. In the main body 21, the transferring body 1 having the above-mentioned shape is embedded and fixed at a predetermined position. On the upper surface of the main body 21, ridges 23, 24 are formed in a cross shape centered at the transferring body 1.

A light beam irradiated onto the transferring body 1 is reflected also at the ridges 23, 24. Since the reflected light contains a tracking error signal, the movement control of the optical system is carried out using the signal. The positioning in the track width direction for the irradiation of a light beam onto the transferring body 1 is carried out using the ridge 23, and the same in the track length direction using the ridge 24. By virtue of this, the light beam is irradiated accurately onto the transfer reproducing film.

Embodiment 8

Figure 14A:
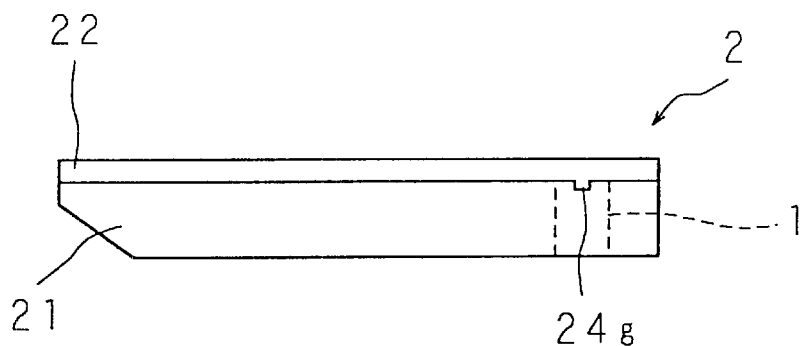
FIGS. 14A–14B are diagrams of the structure of another slider of the present invention.
Figure 14B:
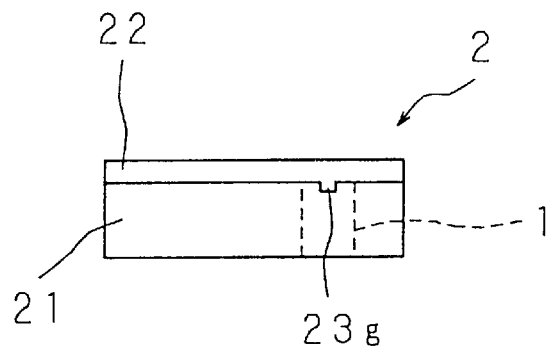

FIGS. 14A and B are diagrams of the structure of a slider in which grooves are formed as the guiding portion. FIGS. 14A and 14B are side views. In the main body 21, the transferring body 1 having the above-mentioned shape is embedded and fixed at a predetermined position. In the upper surface of the main body 21, grooves 23g, 24g are formed in a cross shape centered at the transferring body 1. The other configuration is similar to that in Embodiment 7. The positioning f in the track width direction or the irradiation of a light beam onto the transferring body 1 is carried out using the grooves 23g, and the same in the track length direction using the groove 24g. By virtue of this, the light beam is irradiated accurately onto the transfer reproducing film.

Embodiment 9

The description of the reproducing heads and the reproducing methods described above has been made for the cases in which the transferring body is arranged such that a plurality of transfer paths align in the track length direction and in which the record marks are aligned in parallel in the track length direction are transferred. However, record marks to be transferred are not restricted to those parallelly aligned in the track length direction. Described below is a case that record marks parallelly aligned in the track width direction, or record marks formed in adjacent tracks, are transferred for reproduction.

Figure 15:
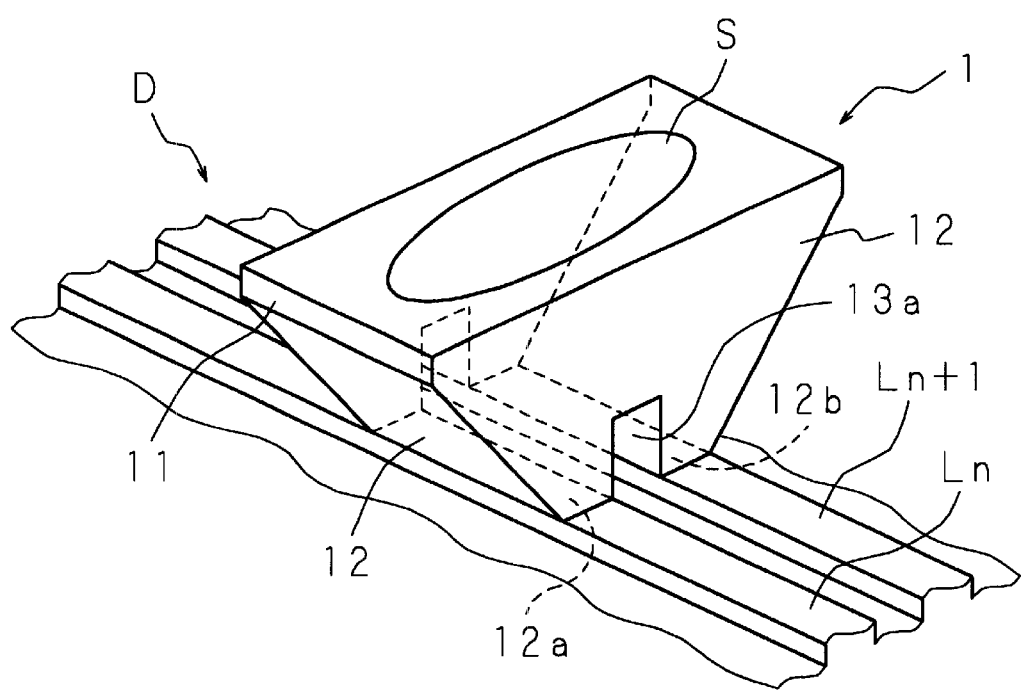
FIG. 15 is a perspective view showing the structure of a transferring body of Embodiment 9.

FIG. 15 is a perspective view showing the structure of a transferring body 1 of Embodiment 9. Two transfer paths 12 are formed under a transfer reproducing film 11 and separated by an insulating gap 13a in the track width direction. That is, in the transfer paths 12, the transfer facing surfaces 12a, 12b face tracks $L_n$, $L_{n+1}$ adjacent to each other, respectively. The dimension of the insulating gap 13a in the track width direction is generally equal to the width of a groove G on a magneto-optical disk D. The dimension of the transfer facing surfaces 12a, 12b in the track width direction is generally equal to the width of a track $L_n$, $L_{n+1}$, while the dimension in the track length direction is generally equal to one channel clock length. The transfer reproducing film 11 and the transfer paths 12 are composed of magnetic garnet films such as $TbBi_2Fe_4GaO_{12}$. The other configuration of the transferring body 1 and the configuration of the reproducing apparatus are similar to those of the transferring body 1 of Embodiment 1.

In case that the reproduction of a magneto-optical disk D is carried out similarly to Embodiment 1 by using the transferring body 1 having such a structure, record marks on the two adjacent tracks are simultaneously transferred onto the transfer reproducing film 11. Using the reflected light suffering form waveform interference, the data for two tracks can be simultaneously reproduced by maximum-likelihood detection of PR(1, 0, −1) or PR(1, 1). Further, since the insulating gap 13a is provided between the transfer paths 12, an effect similar to that of Embodiment 1 is obtained.

Embodiment 10

Figure 16:
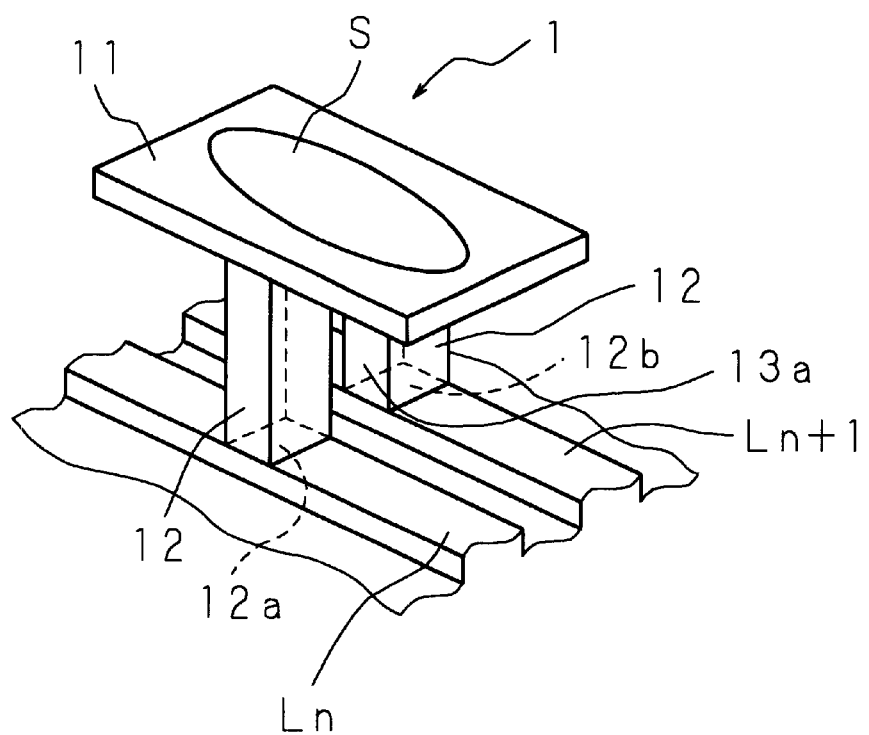
FIG. 16 is a perspective view showing the structure of a transferring body of Embodiment 10.

FIG. 16 is a perspective view showing the structure of a transferring body of Embodiment 10. Similarly to Embodiment 9, in order to transfer record marks on two adjacent tracks onto a transfer reproducing film 11, two transfer paths 12 are formed so as to be separated by an insulating gap 13a in the track width direction. The transfer paths 12 have the shape of rectangular plates. The transfer paths 12 and the transfer reproducing film 11 may be composed of different magnetic materials. In case that the reproduction of a magneto-optical disk D is carried out using such a transferring body 1, an effect similar to that of Embodiment 9 is obtained.

The description of Embodiments 9 and 10 has been made for the cases that the data for two adjacent tracks is simultaneously reproduced. However, the present invention is not restricted to the case of two tracks. By providing a number of transfer paths corresponding to the number of tracks, and by performing the maximum-likelihood detection corresponding to the waveform interference type of the transferring body, the data on a plurality of tracks can be simultaneously reproduced.

Embodiment 11

Figure 17:
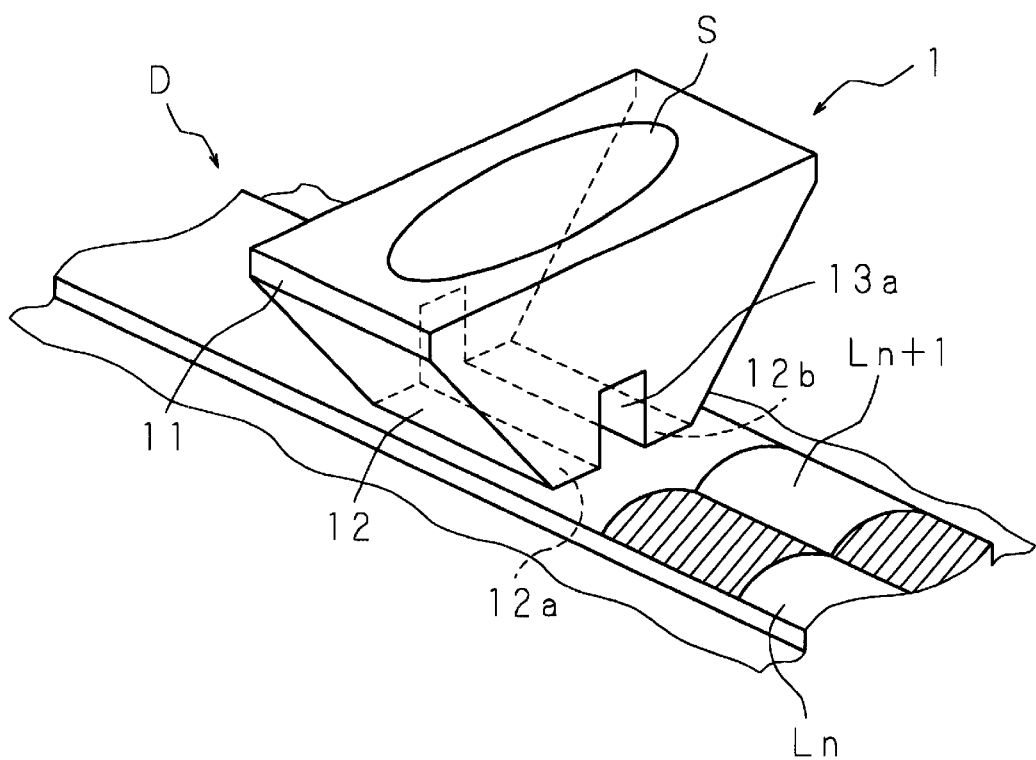
FIG. 17 is a perspective view showing the state of a transferring body of Embodiment 11 during reproduction.

FIG. 17 is a perspective view showing the state of a transferring body of Embodiment 11 during reproduction. Similarly to Embodiment 9, in order to transfer record marks on two adjacent tracks, transfer paths 12 are arranged in the track width direction. On a magneto-optical disk D, two tracks $L_n$, $L_{n+1}$ are formed in a land. On each track $L_n$, $L_{n+1}$, record marks are formed without forming any grove. Since the transferring body 1 has an insulating gap 13a between the transfer paths 12, record marks on two tracks having no groove therebetween can be transferred onto a transfer reproducing film 11 without affecting the magnetization with each other, and hence an effect similar to that of Embodiment 9 is obtained. In FIG. 17, a medium having two tracks in a land is shown. However, the present invention is not restricted to this, and is applicable even to a medium in which grooves are not formed, for example, a medium in which tracking control is carried out using pits.

Embodiment 12

Figure 18:
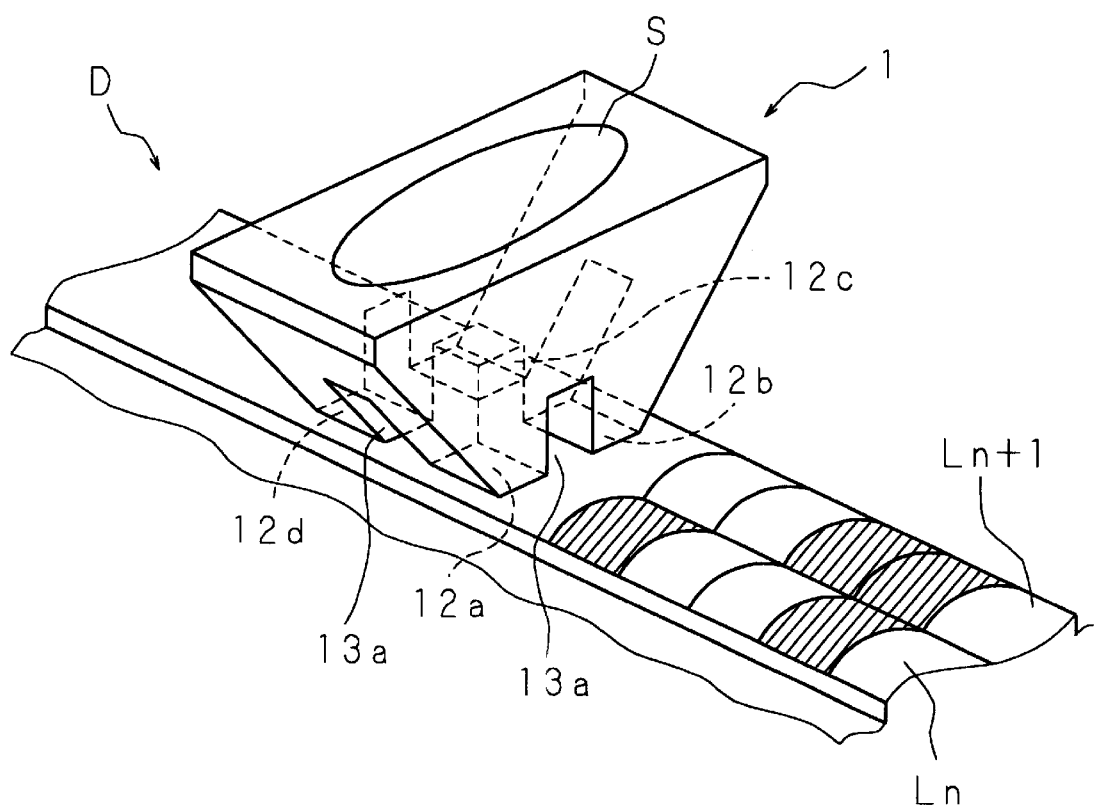
FIG. 18 is a perspective view showing the structure of a transferring body of Embodiment 12.

FIG. 18 is a perspective view showing the structure of a transferring body of Embodiment 12. Four transfer paths 12 are formed under a transfer reproducing film 11 in the form of a matrix so as to be separated by an insulating gap 13a in the track width direction and in the track length direction. A magneto-optical disk D is a type having two tracks in a land.

Figure 19:
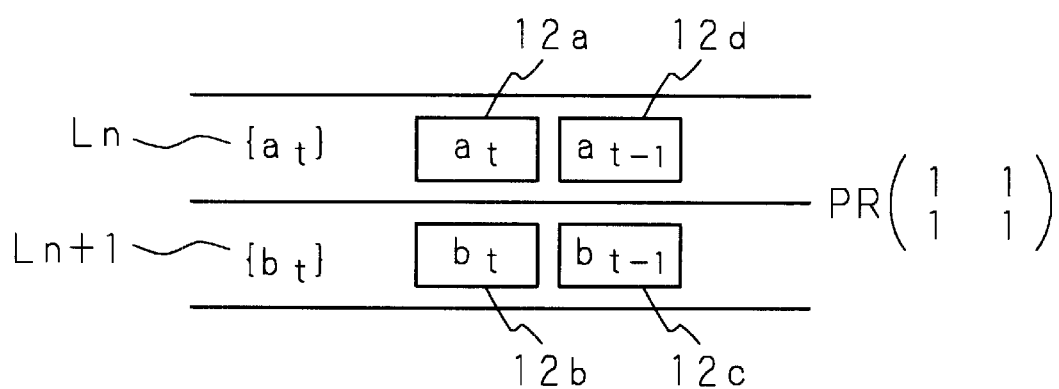
FIG. 19 is an illustrative diagram showing the positional relation between the transfer facing surfaces of the transferring body of FIG. 18 and tracks.

FIG. 19 is an illustrative diagram showing the positional relation between the transfer facing surfaces of the transferring body and tracks of Embodiment 12. The dimension in the track width direction of transfer facing surfaces 12a, 12b and transfer facing surfaces 12c, 12d including the insulating gap 13a is generally smaller than the width of two tracks, and the respective transfer facing surfaces face adjacent tracks $L_n$, $L_{n+1}$. Further, the dimension in the track length direction of transfer facing surfaces 12a, 12b and transfer facing surfaces 12c, 12d including the insulating gap 13a is generally smaller than two channel clock lengths, and the respective transfer facing surfaces face adjacent record marks. The transfer reproducing film 11 and the transfer paths 12 are composed of magnetic garnet films such as $TbBi_2Fe_4GaO_{12}$. The configuration of the reproducing apparatus comprising the transferring body 1 is similar to that in Embodiment 1.

In case that the reproduction of the magneto-optical disk D is carried out similarly to Embodiment 1 by using the transferring body 1 having such a structure, record marks on two adjacent tracks and record marks adjacent on the same track are simultaneously transferred onto the transfer reproducing film 11, thereby causing two-dimensional waveform interference. The waveform interference type in this case is $$PR \begin{bmatrix} 1, & 1 \\ 1, & 1 \end{bmatrix}.$$

Figure 20:
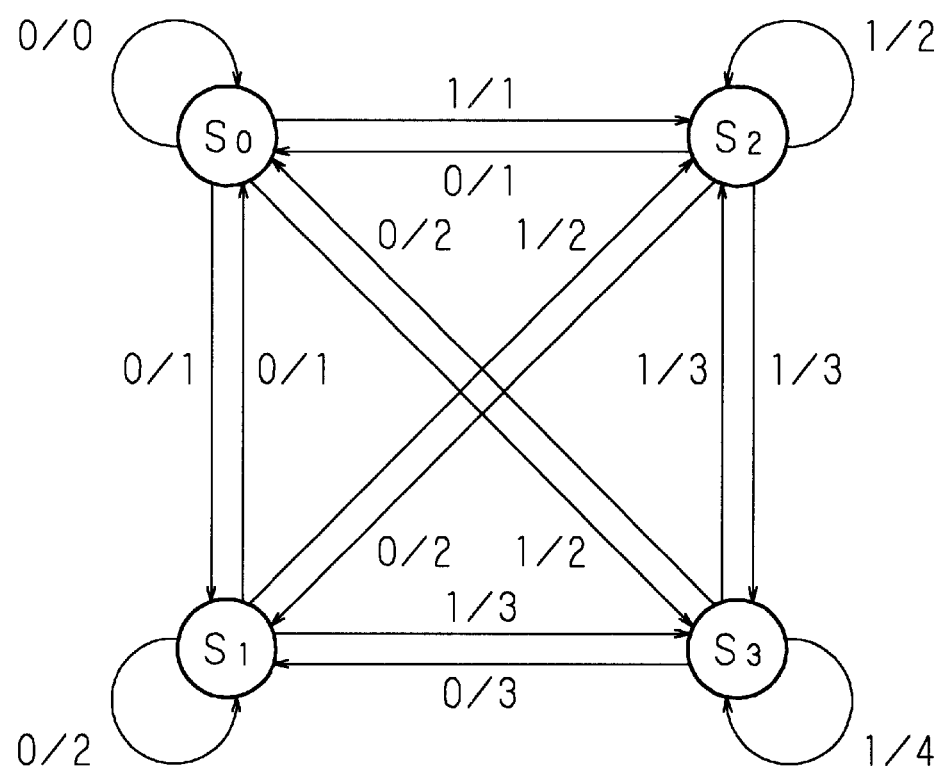
FIG. 20 is a diagram of the state transition for $$PR\begin{bmatrix}1, & 1\\ 1, & 1\end{bmatrix}.$$

Using the reflected light from the transfer reproducing film 11, two dimensional 2×2 data is reproduced by maximum-likelihood detection similarly to Embodiment 1. FIG. 20 is a diagram of the state transition for $$PR \begin{bmatrix} 1, & 1 \\ 1, & 1 \end{bmatrix}.$$

The method of detecting data from the waveform interference type and a series of sample values is known to the public, and hence the description is omitted herein. As such, in Embodiment 12, record marks on two adjacent tracks can be simultaneously reproduced, while record marks on the same track can be reproduced by maximum-likelihood detection. Further, since the insulating gap 13a is provided between the transfer paths 12, an effect similar to that of Embodiment 1 is obtained.

The description of Embodiment 12 has been made for the case of reproduction of two dimensional 2×2 data, however, the present invention is not restricted to this. By forming a predetermined number of transfer paths in the transferring body, two dimensional m×m data can be reproduced. Further, the shape of transfer paths 12 is not restricted to the above-mentioned shape. Even in case of the shape of a rectangle plate, two dimensional data can be reproduced.

Embodiment 13

The description of the reproducing methods of the above-mentioned Embodiments 1 through 12 has been made for the cases that a reproduced signal is obtained by the Kerr effect in the reflected light from the transferring body. However, a reproduced signal suffering from waveform interference can be obtained by the Faraday effect in the incident light.

Figure 21:
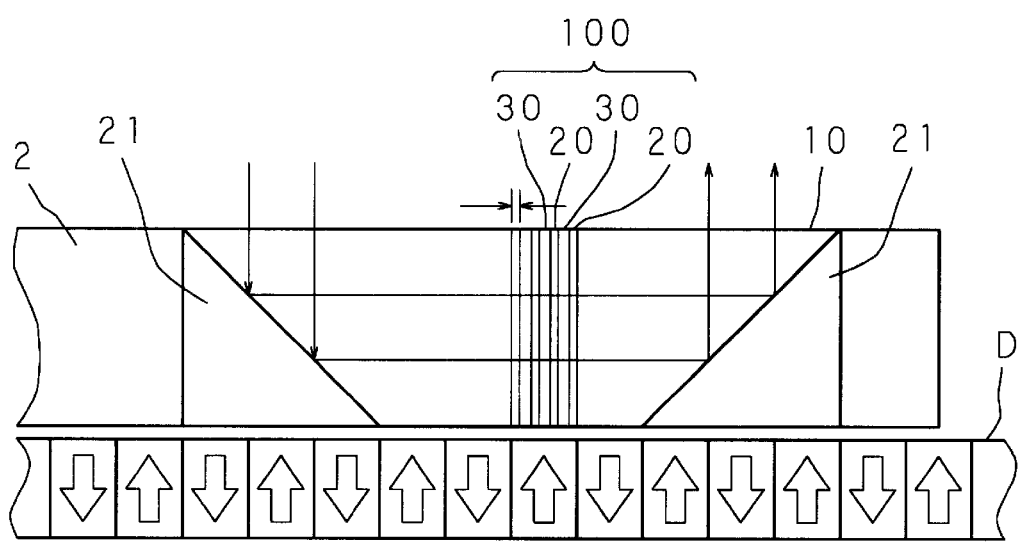
FIG. 21 is a cross sectional diagram showing the configuration of a reproducing head comprising a transferring body of Embodiment 13.

FIG. 21 is a cross sectional diagram showing the configuration of a reproducing head comprising a transferring body of Embodiment 13. A transferring body 10 is arranged so as to face a magneto-optical disk D, and has a rectangular shape in plan view. The transferring body 10 has generally a trapezoidal shape in vertical cross sectional view. The light beam incident side thereof has a larger area than the side facing the magneto-optical disk D. The transferring body 10 is provided with a transfer layering portion 100 generally in the center. The dimension in the track length direction of the transfer layering portion 100 is one channel clock length or shorter. The transfer layering portion 100 is formed by layering both magnetic films 20, such as $TbBi_2Fe_4GaO_{12}$, and insulating films 30, such as glass and polycarbonate, alternatingly in the track length direction. The magnetic films 20 and the insulating films 30 are layered in a film thickness of 5 nm through 10 nm. The part of the transferring body 10 other than the transfer layering portion 100 may be composed of any magnetic or insulating material capable of transmitting the light. The transferring body 10 is formed by layering in the track length direction by vapor deposition, sputtering method, and the like.

In a reproducing head, the transferring body 10 is embedded and fixed in a slider 2, while mirrors 21 are arranged on both sides so that the incident light is reflected in the oblique surfaces forming the trapezoid of transferring body 10. At reproduction, a light beam is incident on the transferring body 10, and reflected in the mirrors 21 thereby to be transmitted through the transferring body 10 in the track length direction. At that time, the magnetic flux of a record mark being faced is transferred onto the magnetic films 20 in the transfer layering portion 100 of the transferring body 10, whereby the polarization plane is rotated when the incident light is transmitted through the transfer layering portion 100. The light is then reflected by the mirror 21, and emitted from the transferring body 10 thereby to be received by a photoelectric converting unit 8 (see FIG. 2). The configuration of a reproducing apparatus for reproducing the data by obtaining a reproduced signal from the transmitted light is similar to that of Embodiment 1, and hence the description is omitted. In Embodiment 13, the transfer layering portion 100 transfers a single record mark, and hence the waveform interference type is PR(1). This indicates the absence of waveform interference.

By being transmitted through the transfer layering portion 100, the magneto-optical effect is amplified thereby to increase the SN ratio of the reproduced signal. As such, in the transferring body 10, insulating films 30 are inserted between a plurality of magnetic films 20 having a large magneto-optical effect, whereby the light is transmitted through the plurality of magnetic films 20 onto which the magnetic flux to be used in the reproduction has been transferred. Accordingly, record marks recorded by high density recording can be reproduced with a high SN ratio. Further, since the number of record marks through which the incident light is transmitted can be reduced, record marks recorded by high density recording can be reproduced by super-resolution reproduction.

Embodiment 14

Figure 22:
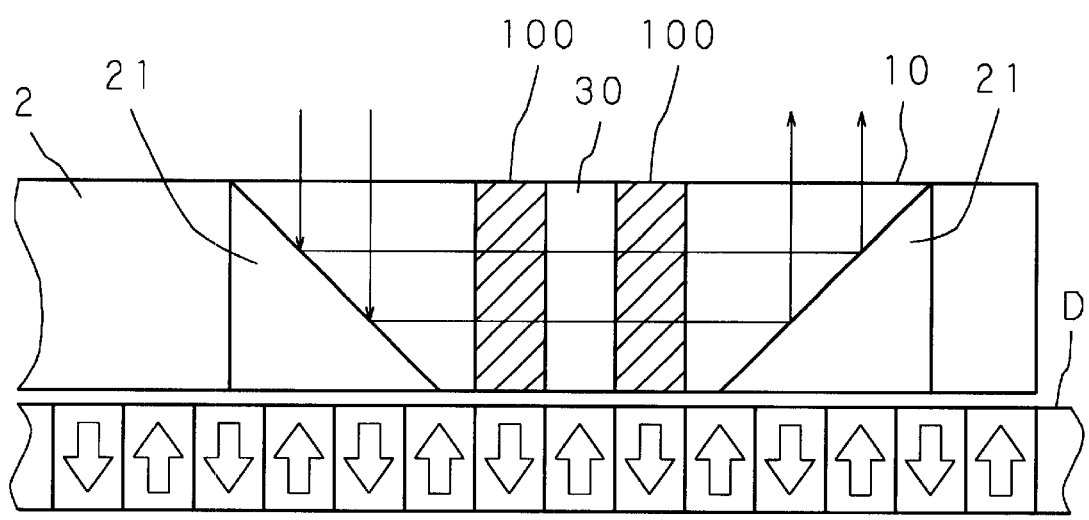
FIG. 22 is a cross sectional diagram showing the configuration of a reproducing head comprising a transferring body of Embodiment 14.

FIG. 22 is a cross sectional diagram showing the configuration of a reproducing head comprising a transferring body 10 of Embodiment 14. In a transferring body 10, two transfer layering portions 100 are arranged in the track length direction with an insulting film 30 intervening therebetween. The dimension of each transfer layering portion 100 in the track length direction is generally one channel clock length or shorter. A plurality of transfer layering portions 100 are formed with the insulting film 30 intervening therebetween having a dimension generally equal to one channel clock length. The other configuration of the transferring body 10 is similar to that in Embodiment 13, and hence the description is omitted.

At reproduction, a light beam is incident on the transferring body 10, and reflected by the mirrors 21 thereby to be transmitted through the transferring body 10 in the track length direction. At that time, the magnetic flux of record marks separated from each other by one channel clock length is transferred onto the magnetic films 20 in the two transfer layering portions 100 of the transferring body 10. The light suffering from waveform interference due to the transmission through the transfer layering portions 100 is emitted from the transferring body 10 thereby to be received by a photoelectric converting unit 8 (see FIG. 2). The configuration of a reproducing apparatus for reproducing the data by obtaining a reproduced signal from the transmitted light is similar to that of Embodiment 1, and hence the description is omitted. In Embodiment 14, it is known in advance that waveform interference type PR(1, 0, 1) occurs.

As such, by being transmitted through the transfer layering portions 100, the magneto-optical effect is amplified thereby to increase the SN ratio of the reproduced signal. Since in the transferring body 10, the insulating film 30 is inserted between the transfer layering portions 100 having a large magneto-optical effect, a plurality of record marks can be transferred without being affected by the magnetization with each other. Further, since the incident light is transmitted through the plurality of magnetic films 20 within the transfer layering portions 100, the SN ratio of the reproduced signal is improved. Furthermore, since the number of record marks through which the incident light is transmitted can be reduced, record marks recorded by high density recording can be reproduced by super-resolution reproduction, while the plurality of record marks transferred onto the transferring body 10 can be reproduced by maximum-likelihood detection.

Embodiment 15

Figure 23:
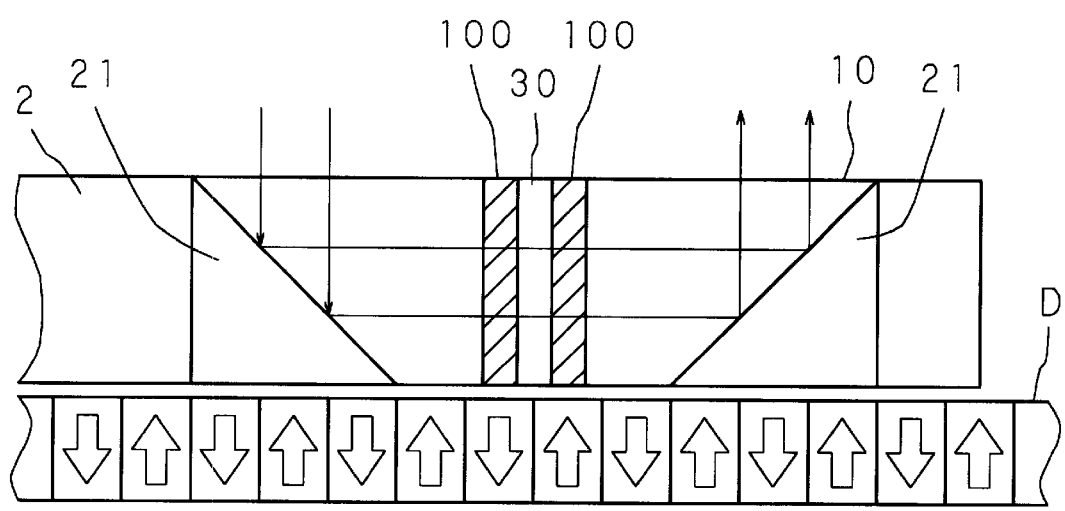
FIG. 23 is a cross sectional diagram showing the configuration of a reproducing head comprising a transferring body of Embodiment 15.

FIG. 23 is a cross sectional diagram showing the configuration of a reproducing head comprising a transferring body of Embodiment 15. In a transferring body 10, two transfer layering portions 100 are arranged in the track length direction with an insulting film 30 intervening therebetween. The dimension of each transfer layering portion 100 in the track length direction is shorter than one channel clock length. The dimension of the two transfer layering portions 100 with the insulting film 30 intervening therebetween is generally equal to two channel clock lengths or shorter. The other configuration of the transferring body 10 is similar to that in Embodiment 13, and hence the description is omitted.

At reproduction, a light beam is incident on the transferring body 10, and reflected by the mirrors 21 thereby to be transmitted through the transferring body 10 in the track length direction. At that time, the magnetic flux of adjacent record marks is transferred onto the magnetic films 20 in the two transfer layering portions 100 of the transferring body 10. The light suffering from waveform interference due to the transmission through the transfer layering portions 100 is emitted from the transferring body 10 thereby to be received by a photoelectric converting unit 8 (see FIG. 2). The configuration of a reproducing apparatus for reproducing the data by obtaining a reproduced signal from the transmitted light is similar to that of Embodiment 1, and hence the description is omitted. In Embodiment 14, it is known that waveform interference type PR(1, 1) occurs.

By being transmitted through the transfer layering portions 100, the magneto-optical effect is amplified thereby to increase the SN ratio of the reproduced signal. Since in the transferring body 10, the insulating film 30 is inserted between the transfer layering portions 100 having a large magneto-optical effect, a plurality of record marks can be transferred without being affected by the magnetization with each other. Further, since the incident light is transmitted through the plurality of magnetic films 20 within the transfer layering portions 100, the SN ratio of the reproduced signal is improved. Furthermore, since the number of record marks through which the incident light is transmitted can be reduced, record marks recorded by high density recording can be reproduced by super-resolution reproduction, while the plurality of record marks transferred onto the transferring body 10 can be reproduced by maximum-likelihood detection.

The description of Embodiments 14, 15 has been made for the cases that a plurality of transfer layering portions 100 are provided with an insulting film 30 intervening therebetween. However, the present invention is not restricted to this. The transfer layering portion 100 may be of a single layer of a magnetic material such as magnetic garnet film. In that case, record marks are transferred onto each of the single layers separated by the insulting film 30.

Even in the case that a reproduced signal is obtained by the Faraday effect in the light incident on the transferring body 10 as shown in Embodiments 13 through 15, the simultaneous reproduction for a plurality of tracks can be carried out by forming a plurality of transfer layering portions 100 separated by insulating regions in the track width direction as shown in Embodiments 9 through 12.

Further, the description of the above-mentioned embodiments has been made for the cases that record marks thermo-magnetically recorded onto a magneto-optical disk are transferred onto a transferring body and that the reproduction of the record marks are carried out using a magneto-optical reproduced signal. However, the present invention is not restricted to this. Data magnetically recorded onto a magnetic disk can be transferred onto a transferring body and then reproduced.

The magnetic material constituting the transferring body is not restricted to those described above, and may be any material onto which the magnetic flux can be transferred when being arranged so as to face the information recording medium. Such materials include: an alloy film such as GdFeCo; and an Ortho-ferrite such as $YFeO_3$.

Industrial Applicability

As such, in an information reproducing element of the present invention, since a plurality of transferring portions are arranged with magnetically insulating regions intervening therebetween, a plurality of record marks recorded by high density recording can be transferred with being insulated with each other thereby to be reproduced from the information reproducing element. Further, maximum-likelihood detection can be carried out using reflected or transmitted light suffering from waveform interference, thereby permitting a high precision reproduction even from a reproduced signal having a low SN ratio. Furthermore, since the number of record marks included within the reflected or transmitted light can be reduced, information recorded by high density recording can be reproduced by super resolution reproduction.

What is claimed is:

1. An information reproducing element which is arranged so as to face an information recording film having a plurality of record marks formed in parallel thereon, and transfers the magnetic flux of the information recording film to be reproduced, comprising:

a plurality of transferring portions having magnetically insulating regions intervening therebetween in the direction in which said record marks are aligned in parallel;

wherein the shape of the surfaces of said transferring portions facing said information recording film corresponds to the shape of record marks formed on said information recording film.

2. The information reproducing element as set forth in claim 1, wherein the direction in which said record marks are aligned in parallel is the length direction and/or the width direction of the tracks on an information recording film.

3. An information reproducing element which is arranged so as to face an information recording film having a plurality of record marks formed in parallel thereon, and transfers the magnetic flux of the information recording film to be reproduced, comprising:

a plurality of transferring portions having magnetically insulating regions intervening therebetween in the direction in which said record marks are aligned in parallel; and a transfer reproducing film onto which the transferred magnetic flux is to be reproduced, on the side opposite to the side of said transferring portions facing said information recording film.

4. An information reproducing element which is arranged so as to face an information recording film having a plurality of record marks formed in parallel thereon, and transfers the magnetic flux of the information recording film to be reproduced, comprising:

a plurality of transferring portions having magnetically insulating regions intervening therebetween in the direction in which said record marks are aligned in parallel, wherein both the dimension of the surfaces of said transferring portions facing said information recording film and the dimension of said insulating regions are generally equal to the reference clock length for recording and reproduction, respectively.

5. An information reproducing element which is arranged so as to face an information recording film having a plurality of record marks formed in parallel thereon, and transfers the magnetic flux of the information recording film to be reproduced, comprising:

a plurality of transferring portions having magnetically insulating regions intervening therebetween in the direction in which said record marks are aligned in parallel, wherein the dimension of the surfaces of said transferring portions facing said information recording film is generally equal to the reference clock length for recording and reproduction, while the dimension of said insulating regions is equal to an integer multiple of the reference clock length.

6. An information reproducing element which is arranged so as to face an information recording film having a plurality of record marks formed in parallel thereon, and transfers the magnetic flux of the information recording film to be reproduced, comprising:

a plurality of transferring portions having magnetically insulating regions intervening therebetween in the direction in which said record marks are aligned in parallel, wherein the dimension of the surfaces of said transferring portions facing said information recording film is smaller than the reference clock length for recording and reproduction, while the dimension of said transferring portions including said insulating regions is equal to an integer multiple of the reference clock length.

7. The information reproducing element as set forth in claim 1 or 2, comprising a transfer layering portion in which said transferring portions and said insulating regions are alternatingly layered in the direction in which said record marks are aligned in parallel and which is arranged so as to face one or a plurality of said record marks.

8. The information reproducing element as set forth in claim 7, wherein a plurality of said transfer layering portions are formed so as to be separated by a predetermined length in the direction in which said record marks are aligned in parallel.

9. An information reproducing head comprising:

an information reproducing element which is arranged so as to face an information recording film having a plurality of record marks formed in parallel thereon, and transfers the magnetic flux of the information recording film to be reproduced;

a plurality of transferring portions having magnetically insulating regions intervening therebetween in the direction in which said record marks are aligned in parallel; and a slider onto which said information reproducing element is mounted and which is arranged so as to face an information recording medium having said information recording film;

wherein the shape of the surfaces of said transferring portions facing said information recording film corresponds to the shape of record marks formed on said information recording film.

10. An information reproducing head comprising:

an information reproducing element which is arranged so as to face an information recording film having a plurality of record marks formed in parallel thereon, and transfers the magnetic flux of the information recording film to be reproduced;

a plurality of transferring portions having magnetically insulating regions intervening therebetween in the direction in which said record marks are aligned in parallel;

a transfer layering portion in which said transferring portions and said insulating regions are alternatingly layered in the direction in which said record marks are aligned in parallel and which is arranged so as to face one or a plurality of said record marks;

a slider onto which said information reproducing element is mounted and which is arranged so as to face an information recording medium having said information recording film; and a reflecting member for reflecting a light beam incident on said information reproducing element.

11. The information reproducing head as set forth in claim 9, wherein said slider includes ridges or grooves, formed in parallel to the length direction and the width direction of the tracks on said information recording medium, for positioning a light beam irradiated onto said information reproducing element.

12. An information reproducing apparatus comprising:

an information reproducing head including:

an information reproducing element which is arranged so as to face an information recording film having a plurality of record marks formed in parallel thereon, and transfers the magnetic flux of the information recording film to be reproduced;

a plurality of transferring portions having magnetically insulating regions intervening therebetween in the direction in which said record marks are aligned in parallel; and a slider onto which said information reproducing element is mounted and which is arranged so as to face an information recording medium having said information recording film;

a photoelectric converting unit for receiving emitted light from said information reproducing element and detecting a reproduced signal;

a sample value detecting unit for obtaining a sample value by waveform interference from the detected reproduced signal; and a maximum-likelihood detecting unit for performing maximum-likelihood detection depending on the waveform interference type of said information reproducing element by using the sample value obtained by said sample value detecting unit.

13. An information reproducing method for reproducing the recorded information by using said information reproducing head having an information reproducing element which is arranged so as to face an information recording film having a plurality of record marks formed in parallel thereon, and transfers the magnetic flux of the information recording film to be reproduced, a plurality of transferring portions having magnetically insulating regions intervening therebetween in the direction in which said record marks are aligned in parallel, and a slider onto which said information reproducing element is mounted and which is arranged so as to face an information recording medium having said information recording film, comprising the steps of:

irradiating a light beam onto said information reproducing element arranged so as to face an information recording medium;

detecting a reproduced signal by the magneto-optical effect;

obtaining a sample value by waveform interference from said reproduced signal; and reproducing the information by maximum-likelihood detection depending on the waveform interference type of said information reproducing element by using the obtained sample value.

14. An information reproducing element which is arranged so as to face an information recording film on which a plurality of record marks are formed in parallel and is for transferring the magnetic flux of the information recording film to be reproduced, wherein on one surface to be faced to said information recording film, a plurality of transferring portions having magnetically insulating regions intervening therebetween are arranged in the direction in which said record marks are aligned in parallel, while on the other surface, a transfer reproducing surface onto which a light beam for reproducing the transferred magnetic flux is irradiated is provided, and wherein both the dimension of the surfaces of said transferring portions facing said information recording film and the dimension of said insulating regions are generally equal to the reference clock length for recording and reproduction, respectively.

15. The information reproducing element as set forth in claim 3, wherein the direction in which said record marks are aligned in parallel is the length direction and/or the width direction of the tracks on an information recording film.

16. The information reproducing element as set forth in claim 4, wherein the direction in which said record marks are aligned in parallel is the length direction and/or the width direction of the tracks on an information recording film.

17. The information reproducing element as set forth in claim 5, wherein the direction in which said record marks are aligned in parallel is the length direction and/or the width direction of the tracks on an information recording film.

18. The information reproducing element as set forth in claim 6, wherein the direction in which said record marks are aligned in parallel is the length direction and/or the width direction of the tracks on an information recording film.

19. The information reproducing head as set forth in claim 9, wherein the direction in which said record marks are aligned in parallel is the length direction and/or the width direction of the tracks on an information recording film.

20. The information reproducing head as set forth in claim 10, wherein the direction in which said record marks are aligned in parallel is the length direction and/or the width direction of the tracks on an information recording film.

21. The information reproducing head as set forth in claim 13, wherein the direction in which said record marks are aligned in parallel is the length direction and/or the width direction of the tracks on an information recording film.

22. The information reproducing head as set forth in claim 10, wherein said slider comprising ridges or grooves, formed in parallel to the length direction and the width direction of the tracks on said information recording medium, for positioning a light beam irradiated onto said information reproducing element.

* * * * *